United States Patent
Sajadi et al.

(10) Patent No.: US 7,972,018 B2
(45) Date of Patent: Jul. 5, 2011

(54) IMAGE PROJECTION SYSTEM WITH AUTO-FOCUS

(75) Inventors: Seyed Behzad Sajadi, Irvine, CA (US); Yasuhiro Komori, Irvine, CA (US); Hung Khei Huang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 12/392,473

(22) Filed: Feb. 25, 2009

(65) Prior Publication Data

US 2010/0214540 A1    Aug. 26, 2010

(51) Int. Cl.
G03B 3/00    (2006.01)
H04N 3/26    (2006.01)

(52) U.S. Cl. ........ 353/101; 353/76; 348/745; 250/201.2
(58) Field of Classification Search .............. 353/76, 353/101, 122; 348/745, 785; 250/201.2, 250/201.4

See application file for complete search history.

(56) References Cited

U.S. PATENT DOCUMENTS

| | | | | |
|---|---|---|---|---|
| 5,479,225 A | * | 12/1995 | Kuga | 353/101 |
| 6,104,880 A | | 8/2000 | Kamishita et al. | 396/133 |
| 6,485,147 B2 | | 11/2002 | Liang | 353/101 |
| 6,530,666 B1 | | 3/2003 | Smith et al. | 353/121 |
| 7,175,285 B2 | | 2/2007 | Li et al. | 353/70 |
| 7,384,160 B2 | | 6/2008 | Matsumoto et al. | 353/101 |
| 7,600,875 B2 | * | 10/2009 | Inoue | 353/69 |

* cited by examiner

*Primary Examiner* — Kevin Pyo
(74) *Attorney, Agent, or Firm* — Fitzpatrick, Cella, Harper & Scinto

(57) ABSTRACT

Focus adjustment for a projector which includes a projection lens having an adjustable focus position. An asymmetrically focused pattern is projected through the projection lens onto a projection screen, wherein the asymmetrically focused pattern is imaged by the projection lens onto the projection screen with a focus at one portion on the screen that differs with focus at another portion thereof. An image of the asymmetrically focused pattern is captured from the projection screen. A focus adjustment direction is calculated by using asymmetrical aspects of the captured image of the asymmetrically focused pattern. The focus position of the projection lens is driven in the calculated focus adjustment direction so as to move from an out-of-focus state of the projection lens toward an in-focus state.

20 Claims, 12 Drawing Sheets

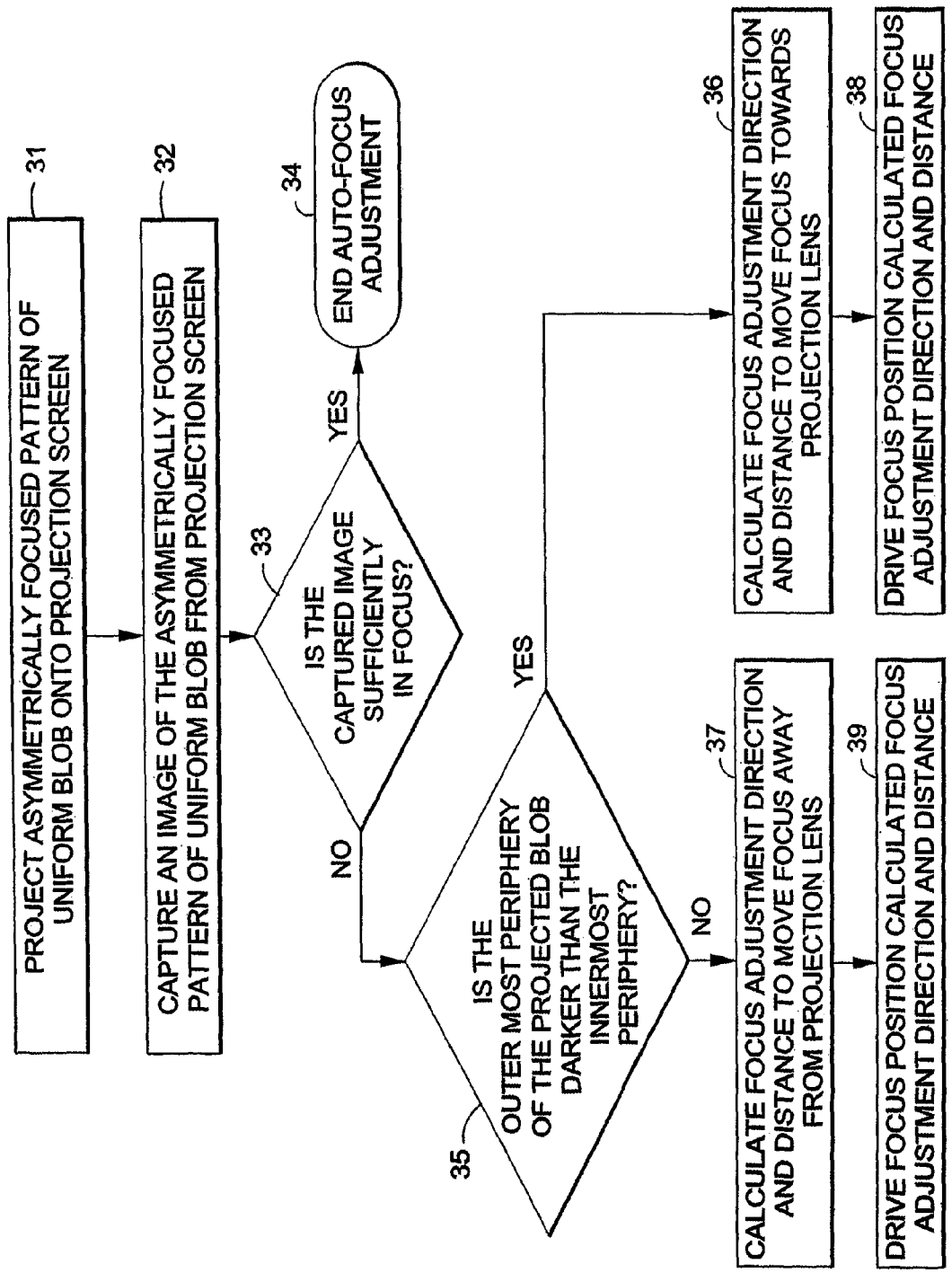

IMAGE PROJECTION SYSTEM WITH AUTO-FOCUS

FIELD

The present disclosure relates to an image projection system which projects images in accordance with image data, such as image data generated by a host computer, and more particularly relates to an image projection system which auto-focuses the projected image.

BACKGROUND

It has generally been considered to provide auto-focus capabilities in a digital projector. Consistent with an auto-focus capability, the digital projector projects an image onto a projection screen, captures an image of the projected image, and moves the focus of the projection lens iteratively in order to move from an out-of-focus position toward an in-focus position.

Correction of focus is typically an iterative, multi-step process. In a first step, a first image is captured. The focus position of the lens is then moved in an arbitrary direction, such as a forward direction toward the screen. A second image is then captured. The focus condition of the first image is compared against the focus condition of the second image. If focus has improved, then the projection lens is iteratively moved in the same direction as before. On the other hand, if focus condition has not improved, then it is assumed that the projection lens had been moved in the wrong direction. Accordingly, the projection lens is moved in the reverse direction. These steps are repeated iteratively, until an adequate in-focus condition is achieved.

It has also been considered to provide projectors with distance-measuring equipment, and to adjust focus based on a measured distance between the projector and the projection screen. Such arrangements differ from the arrangements contemplated herein.

SUMMARY

One difficulty encountered with an iterative auto-focus is that the direction of auto-focus cannot be determined without comparing the captured images from two iterations. Thus, auto-focus is sometimes a lengthy operation while trying to determine the correct direction in which to adjust focus.

The foregoing situation is addressed through the provision of an image projection system in which an asymmetrically focused pattern is projected onto the projection screen. The asymmetrically-focused pattern is a pattern in which the focus at one position on the projection screen differs from that at another position on the projection screen. Through calculations using the captured image of the asymmetrically-focused pattern, the direction of focus change can be determined, typically by using a single captured image and ordinarily without the need to compare the focus condition of one image with that of another.

In an example embodiment described herein, a projector includes a light projecting unit constructed to emit light in accordance with image data, a projection lens constructed to image light emitted by the light projecting unit onto a projection screen, and a focus adjusting mechanism constructed for controllable adjustment of focus of the projection lens. A capture device captures an image of the image projected onto the projection screen by the projection lens. A control unit controls the light projecting unit to emit an asymmetrically focused pattern, and controls the capture device to capture an image of the asymmetrically focused pattern. As noted above, the asymmetrically focused pattern is imaged by the projection lens onto the projection screen with a focus at one portion on the projection screen that differs from the focus at another portion of the projection screen. The control unit calculates a focus adjustment direction by using asymmetrical aspects of the captured image of the asymmetrically focused pattern, and thereafter drives the focus adjusting mechanism in the calculated focus direction, so as to move from an out-of-focus state of the projection lens toward an in-focus state.

The asymmetry of the asymmetrically focused pattern often results from uncorrected aberrations in the projection lens. In one example embodiment, the asymmetrically focused pattern comprises concentric rings which are asymmetrically focused such that rings at a more central location of the pattern are focused by the projection lens differently from rings at a more peripheral location of the pattern. Such asymmetry may be a result of spherical aberrations of the projection lens. A situation where focus is too close to the projection lens is indicated in a case where rings more central to the pattern have better focus than rings at the periphery thereof. Conversely, a situation where focus is too far from the projection lens is indicated in a case where rings at a more central location of the pattern have poorer focus than rings at the periphery. In either case, the direction of focus adjustment can be calculated by using the captured image of the asymmetrically focused pattern, and focus adjustment can be made in the calculated direction.

In a further example embodiment, the asymmetrically focused pattern comprises uniform blobs projected to corners of the projection screen. Because of coma aberration in the projection lens, the blobs are not imaged onto the screen as correspondingly uniform blobs, in situations where the projection lens is out of focus. Rather, a situation where focus is too close to the projection lens is indicated by a blob that is brighter at an outermost periphery as compared to the innermost periphery thereof. Conversely, a situation where focus is too far from the projection lens is indicated in a case where the blob is brighter at the innermost periphery than at the outermost periphery thereof. In either case, focus adjustment direction can be calculated by a captured image of the blobs, and focus adjustment can be accomplished in the calculated direction so as to move from an out-of-focus state toward an in-focus state.

This brief summary has been provided so that the nature of the disclosure may be understood quickly. A more complete understanding can be obtained by reference to the following detailed description and to the attached drawings.

BRIEF DESCRIPTION OF THE DRAWINGS

FIG. 8 is a flowchart illustrating an exemplary auto-focus process for a projection lens having a coma aberration in the first embodiment.

DETAILED DESCRIPTION

First Embodiment

Figure 1:
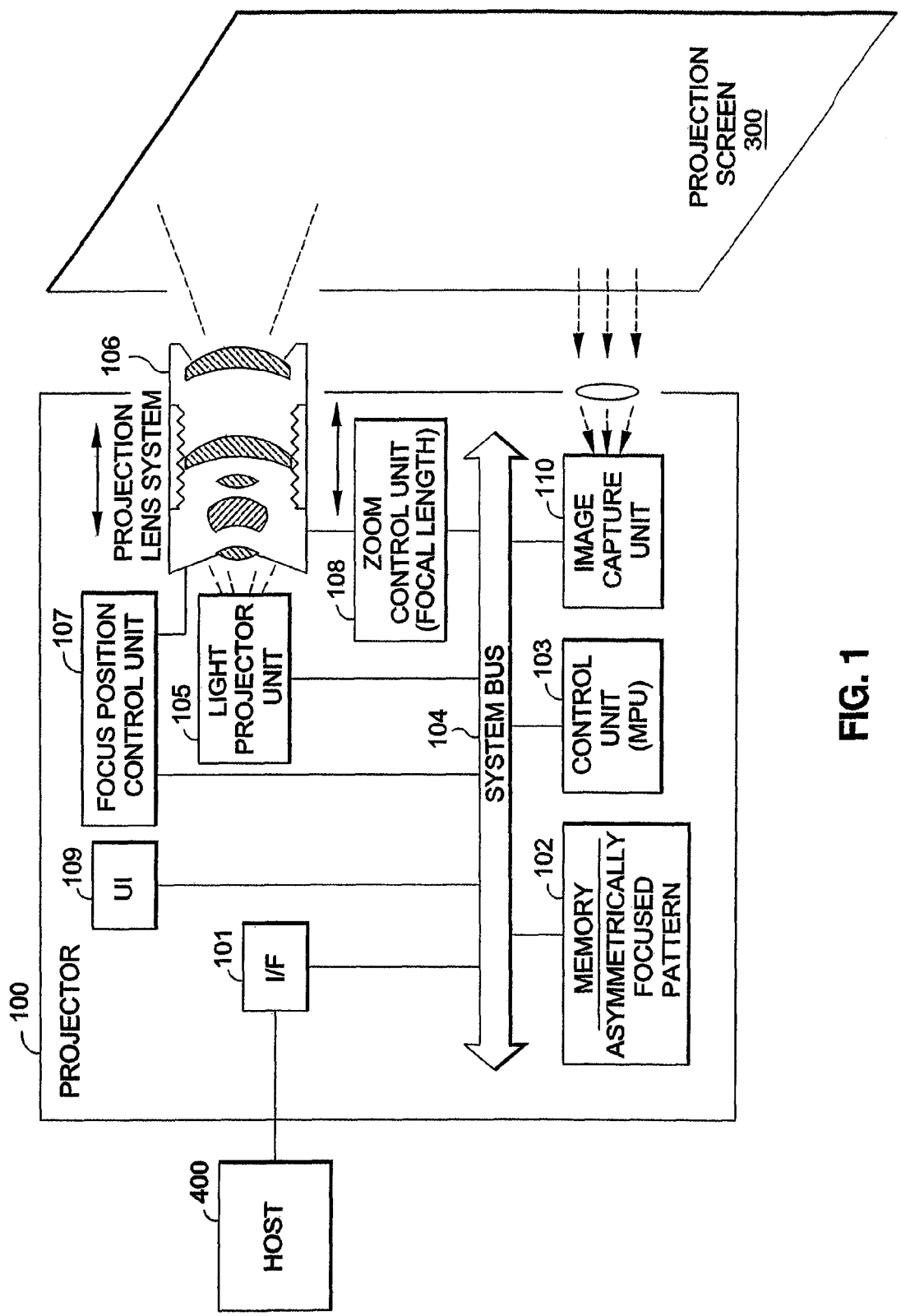
FIG. 1 illustrates a first example embodiment of a digital projector connected to a host for projecting an image onto a projection screen.

FIG. 1 illustrates a first example embodiment. Projector 100 is constructed so as to receive image data from host 400 and project an image onto projection screen 300 in accordance with the image data received from host 400. Host 400 may include any device capable of transmitting image data to projector 100, such as, a laptop PC, desktop PC, DVD player, camcorder, or digital camera. Projector 100 may include, for example, an LCD projector, DLP projector, LCOS projector, or LED projector.

As shown in FIG. 1, projector 100 includes an interface unit (I/F) 101 for receiving data from host 400. Interface unit 101 is coupled to control unit 103 via system bus 104. Control unit 103 is also coupled to memory 102 which is constructed for storing data, such as an asymmetrically focused pattern in accordance with this disclosure.

Projector 100 also includes light projector unit 105 for emitting light in accordance with image data received from host 400 or from memory 102. Light projector unit 105 is coupled to control unit 103, which controls light projector unit 105 via system bus 104. Light projector unit 105 includes an interface that facilitates communication with control unit 103. In addition, control unit 103 includes an interface for communicating with light projector unit 105.

As shown in FIG. 1, projection lens system 106 is constructed with multiple lenses to focus light emitted by light projector unit 105. The lenses of projection lens system 106 have inherent optical properties that affect the focus of a projected image on projection screen 300. Such optical properties may include aberrations in the lenses, such as spherical aberrations and coma aberrations.

Projection lens system 106 is arranged mechanically to allow for adjustable focus position and for adjustable zoom (focal length). The lenses in projection lens system 106 may include a combination of fixed lenses and adjustable lenses that reposition axially. In operation, the magnification of a projected image can be changed by repositioning a zoom lens in projection lens system 106. As the zoom lens moves, the focal length of the projection lens system changes, and a focus lens may be repositioned to keep the projected image sufficiently in focus. Additionally, a projected image can be focused by adjusting the focus position of a focus lens or multiple focus lenses.

Projection lens system 106 is connected to both focus position control unit 107 for adjusting the focus position of projection lens system 106, and zoom control unit 108 for adjusting the focal length of projection lens system 106. Focus position control unit 107 and zoom control unit 108 may include servo motors or a system of gears and cams to drive various lenses within projection lens system 106 to new positions. Focus position control unit 107 and zoom control unit 108 are coupled to control unit 103 via system bus 104, and are constructed to receive commands from control unit 103 to reposition lenses in projection lens system 106. Focus position control unit 107 and zoom control unit 108 include interfaces that facilitate communication with control unit 103. In addition, control unit 103 includes interfaces for communicating with focus position control unit 107 and zoom control unit 108.

Control unit 103 is also coupled to user interface (UI) 109 via system bus 104. User interface 109 is constructed for receiving user input, such as zoom and focus commands. User interface 109 may also include a display for displaying menus and information pertaining to the operation of projector 100.

As shown in FIG. 1, projector 100 also includes image capture unit 110 which is coupled to control unit 103 via system bus 104. Image capture unit 110 is constructed for capturing images from projection screen 300 and is controlled by control unit 103. In addition, image capture unit 110 includes an interface for communicating with control unit 103 and control unit 103 similarly includes an interface for communicating with image capture unit 110. Image capture unit 110 may include a camera with auto-focus set on the sharp boundaries of projection screen 300 or a pinhole camera that is generally in-focus for most distances from projector 100.

In accordance with an example embodiment of the present disclosure, control unit 103 retrieves data for an asymmetrically focused pattern from memory 102 via system bus 104. Memory 102 may store data for multiple asymmetrically focused patterns that may correspond to specific characteristics of the lenses in projection lens system 106. Memory 102 may also receive image data for asymmetrically focused patterns from host 400 via interface unit 101.

After retrieving the image data for an asymmetrically focused pattern, control unit 103 processes the image data and controls light projector unit 105 to emit light in accordance with the image data by sending a projection command to light projector unit 105. The light emitted from light projector unit 105 forms an image of the asymmetrically focused pattern on projection screen 300 after passing through projection lens system 106.

After the asymmetrically focused pattern is projected onto projection screen 300, control unit 103 controls image capture unit 110 by sending an image capture command to capture an image of the asymmetrically focused pattern on projection screen 300. The captured image is then stored in memory 102.

Control unit 103 retrieves the image of the asymmetrically focused pattern from memory 102 and analyzes the captured image to determine whether one portion of the captured asymmetrically focused pattern has a different focus than another portion of the captured asymmetrically focused pattern. If there is more than a threshold difference in focus, control unit 103 calculates a focus adjustment direction by using asymmetrical aspects of the captured asymmetrically focused pattern. Control unit 103 then commands focus position control unit 107 to drive a focus lens in the calculated direction to better focus the projected image of the asymmetrically focused pattern.

Figure 2:
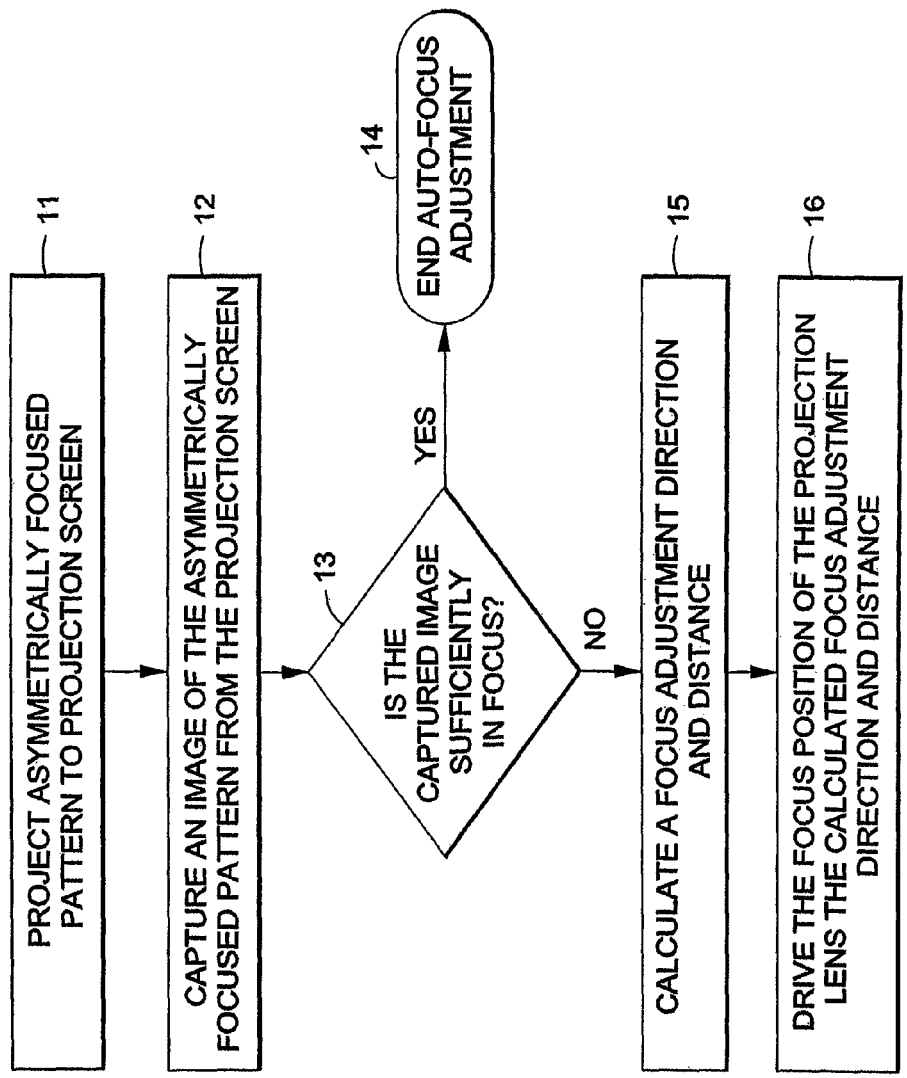
FIG. 2 is a flowchart illustrating an exemplary auto-focus process for the first embodiment.

FIG. 2 is a flowchart detailing an exemplary auto-focus process in projector 100. Briefly, according to the process steps shown in FIG. 2, projector 100 projects an asymmetrically focused pattern through projection lens system 106 onto projection screen 300. The asymmetrically focused pattern is imaged by projection lens system 106 onto projection screen 300 with a focus at one portion on the screen that differs from focus at another portion. Image capture unit 110 then captures an image of the asymmetrically focused pattern from projection screen 300. Control unit 103 calculates a focus adjustment direction and distance by using asymmetrical aspects of the captured image of the asymmetrically focused pattern. Focus position control unit 107 then drives the focus position of projection lens system 106 in the calculated focus adjustment direction so as to move from an out-of-focus state of projection lens system 106 toward an in-focus state.

In more detail, in step 11, control unit 103 causes projector 100 to project an asymmetrically focused pattern to projection screen 300 using light projector unit 105 and projection lens system 106 as discussed above.

In step 12, image capture unit 110 captures an image of the asymmetrically focused pattern from projection screen 300. The captured image is then stored in memory 102.

In step 13, the captured image of the asymmetrically focused pattern is retrieved from memory 102 by control unit 103. Control unit 103 determines whether the captured image is sufficiently in focus by comparing asymmetrical aspects of the captured image at different positions. An asymmetrical aspect of the captured image may include differences in contrast or brightness at different positions in the captured image.

In one example embodiment described below in reference to FIG. 5, control unit 103 determines whether the captured image is sufficiently in focus by comparing positions in the captured image that should have a similar level of high contrast, such as boundary positions between a dark shape and a light background.

In another example embodiment described below in reference to FIG. 8, control unit 103 determines whether the captured image is sufficiently in focus by comparing positions in the captured image that should have a nearly uniform brightness when the projected image is sufficiently in focus.

In step 13, control unit 103 may compare two positions or more than two positions to determine whether the captured image is sufficiently in focus. Control unit 103 may select positions to compare in the captured image by using data for the asymmetrically focused pattern in memory 102. Alternatively, control unit 103 can be programmed to analyze specific positions in the captured image without accessing data for the asymmetrically focused pattern from memory 102.

If asymmetrical aspects of the captured image do not deviate by more than a threshold value, control unit 103 determines that the captured image is sufficiently in focus and ends the auto-focus adjustment in step 14.

If asymmetrical aspects of the captured image deviate by more than a threshold value, then control unit 103 determines that the asymmetrically focused pattern is not sufficiently in focus and calculates a focus adjustment direction and distance in step 15.

In step 15, control unit 103 calculates a focus adjustment direction based on the locations of the positions in the captured image with higher levels of a measured asymmetrical aspect. As described in more detail below in reference to FIG. 5 and FIG. 8, a higher level of contrast or brightness at positions closer to the center of the captured image indicate a focus adjustment in one direction, whereas, a higher level of contrast or brightness at positions farther from the center of the captured image indicate a focus adjustment in the opposite direction.

In step 15, control unit 103 also calculates a focus adjustment distance based on the degree of variation in the measured asymmetrical aspect at different positions of the captured image. Generally, a larger variation in an asymmetrical aspect provides for a greater focus adjustment distance. Control unit 103 may use look-up tables stored in memory 102 to increase the speed of calculating the focus adjustment distance. In such a case, the look-up table provides a focus adjustment distance for a given degree of variation in the measured asymmetrical aspect at different positions in the captured image. In an alternative embodiment, the focus adjustment distance is a set incremental distance, without considering the degree of variation in the measured asymmetrical aspect.

In step 16, control unit 103 commands focus position control unit 107 to drive a focus lens or lenses the calculated focus adjustment direction and distance. Focus position control unit 107 then drives the focus lens or lenses to adjust the focus position of projection lens system 106 so as to move from an out-of-focus state of projection lens system 106 toward an in-focus state.

In other embodiments, focus is re-checked by repeating the above-described process. For example, if there is a large deviation in asymmetrical aspects determined in step 13, then it may be desirable to re-check focus. More precisely, after completing step 16, focus is re-checked by returning to step 12 to capture another image of the asymmetrically focused pattern on projection screen 300. The second captured image is then used by control unit 103 in step 13, as described above, to check if the captured image of the asymmetrically focused pattern is sufficiently in focus after adjusting the focus position of projection lens system 106. If the captured image is not sufficiently in focus, the example process described above would then be repeated until control unit 103 determines that the captured image is sufficiently in focus. The example process of FIG. 2 can also be repeated with a different asymmetrically focused pattern stored in memory 102.

Figure 3B:
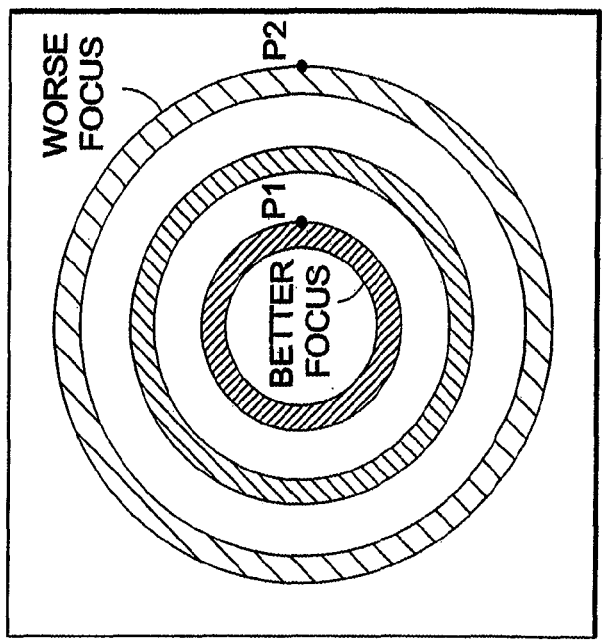
FIG. 3B illustrates an example of an asymmetrically focused pattern corresponding to FIG. 3A.
Figure 3A:
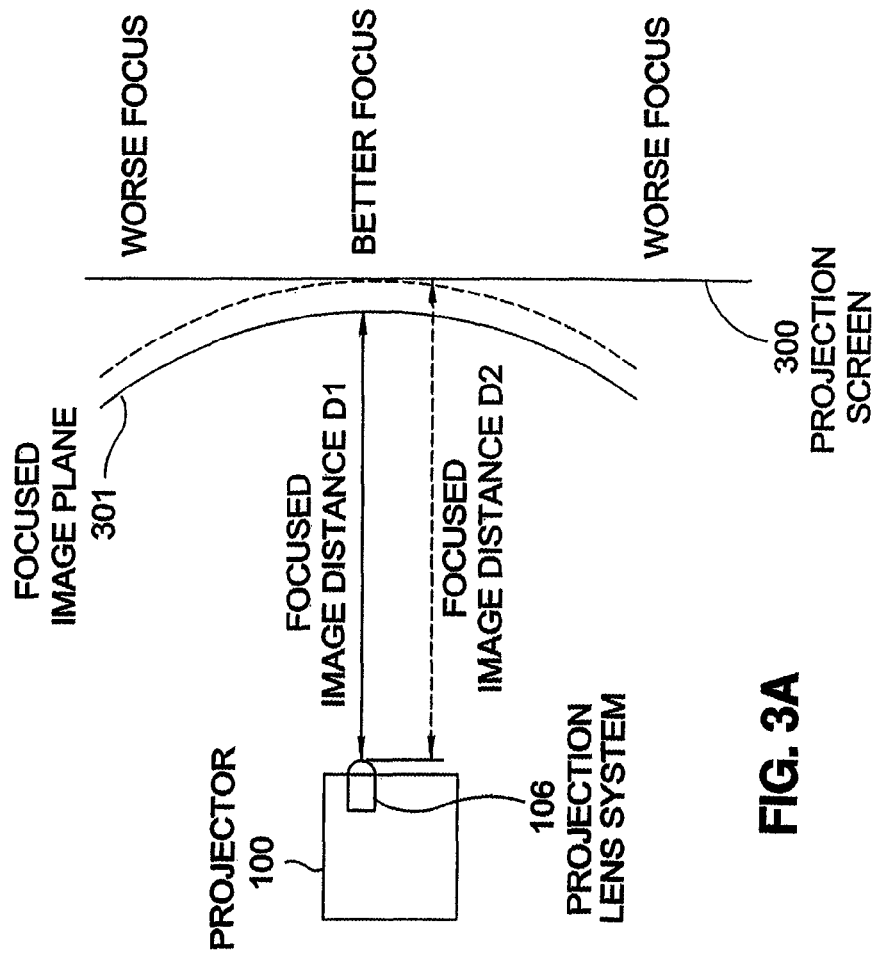
FIG. 3A illustrates an example of focus too close to a projection lens having a spherical aberration.

FIG. 3A is a diagram showing the variation in focus for an asymmetrically focused pattern projected on projection screen 300 when projection lens system 106 of projector 100 has a spherical aberration.

Focused image distance D1 is the distance at which light emitted from projection lens system 106 would be in focus on a theoretical projection screen forming focused image plane 301. Focused image distance D1 corresponds to a specific focus position of projection lens system 106. An image projected onto projection screen 300 is in an out-of-focus state because focused image plane 301 does not sufficiently coincide with projection screen 300. In addition, the spherical aberration of projection lens system 106 increases the curvature of focused image plane 301 about projection lens system 106, thereby increasing the distance between focused image plane 301 and projection screen 300 near the edges of focused image plane 301. As shown in FIG. 3A, when focused image distance D1 is closer to projection lens system 106 than projection screen 300, the center area of a projected image is in better focus than the outer area of the projected image due to the curvature of focused image plane 301.

In accordance with the example process described in FIG. 2 above, control unit 103 would calculate a focus adjustment direction and distance so as to change the focus position of projection lens system 106. The calculated focus adjustment direction and distance would increase focused image distance D1 to focused image distance D2, so that more of the focused image plane coincides with projection screen 300 for better focus of more of the projected image.

FIG. 3B shows an example image of an asymmetrically focused pattern of concentric rings as projected onto projection screen 300 with focused image distance D1 in FIG. 3A. Other asymmetrically focused patterns of concentric rings may include more or less rings of different thicknesses. FIG. 3B also represents an example of an initial image of an asymmetrically focused pattern captured by image capture unit 110.

In FIG. 3B, the center ring of the captured image of the asymmetrically focused pattern is in better focus than the outer ring. Positions P1 and P2 correspond to exemplary boundary positions for the center ring and the outer ring. The difference in focus is measured by control unit 103 by comparing the contrast of the boundary of the center ring at position P1 with the contrast of the boundary of the outer ring at position P2. Control unit 103 can also compare the contrast of additional positions in the captured image to obtain more information regarding the variation in focus throughout the captured image.

In a sufficiently focused state, the boundary of the center ring and the boundary of the outer ring should have a similar contrast within a threshold deviation. However, when projection screen 300 is farther from projection lens system 106 than focused image distance D1, the boundary of the center ring has more contrast than the boundary of the outer ring, indicating better focus of the center ring.

Figure 4B:
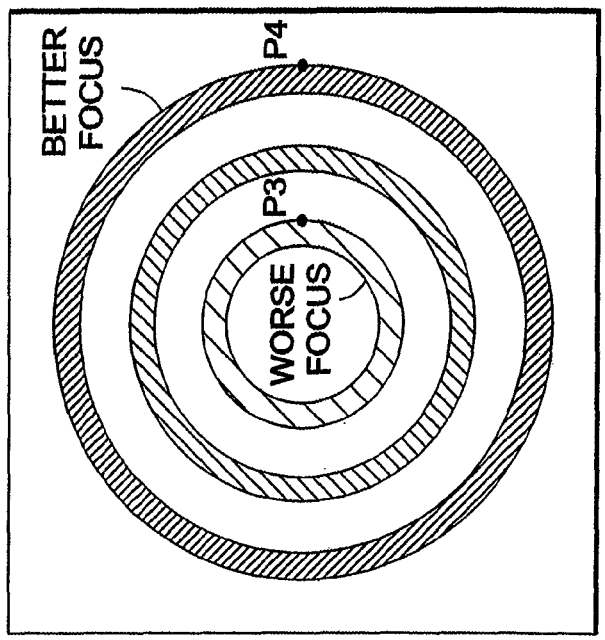
FIG. 4B illustrates an example of an asymmetrically focused pattern corresponding to FIG. 4A.
Figure 4A:
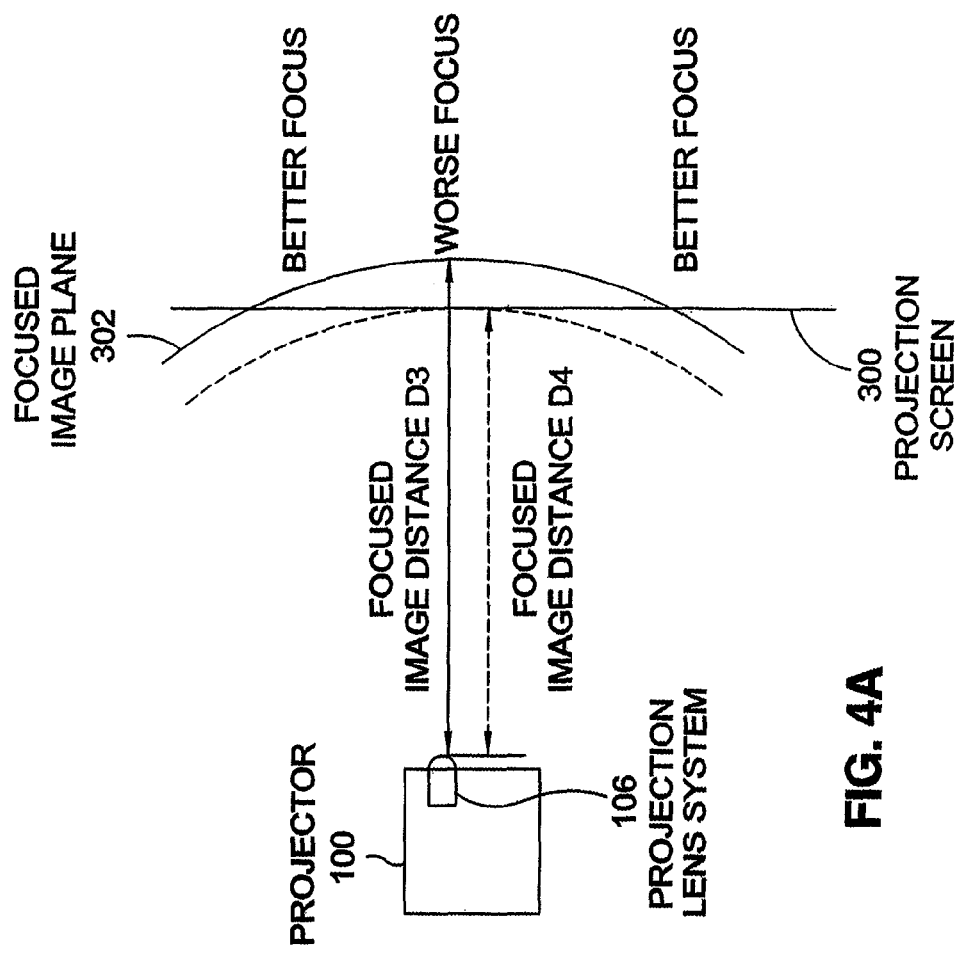
FIG. 4A illustrates an example of focus too far from a projection lens having a spherical aberration.

As shown in FIG. 4A, when projection screen 300 is closer to projection lens system 106 than focused image distance D3, the outer areas of a projected image will be in better focus than the center areas of the projected image due to the spherical aberration of projection lens system 106.

In accordance with the example process described in FIG. 2 above, control unit 103 would calculate a focus adjustment direction and distance so as to decrease focused image distance D3 to focused image distance D4, so that more of the focused image plane 302 coincides with projection screen 300.

FIG. 4B shows an image of an asymmetrically focused pattern of concentric rings as projected onto projection screen 300 with focused image distance D3 in FIG. 4A. FIG. 4B also represents an initial image of an asymmetrically focused pattern captured by image capture unit 110 and stored in memory 102 as described in step 202 of FIG. 2.

In the example of FIG. 4B, the outer ring of the captured image of the asymmetrically focused pattern is in better focus than the center ring. Positions P3 and P4 correspond to exemplary boundary positions for the center ring and the outer ring. As described above, the relative focus of the center ring to the outer ring can be determined by comparing the contrast of the boundary of the center ring at position P3 to the contrast of the boundary of the outer ring at position P4. Control unit 103 can then calculate a focus adjustment direction and distance based on the relative difference in contrast.

Figure 5:
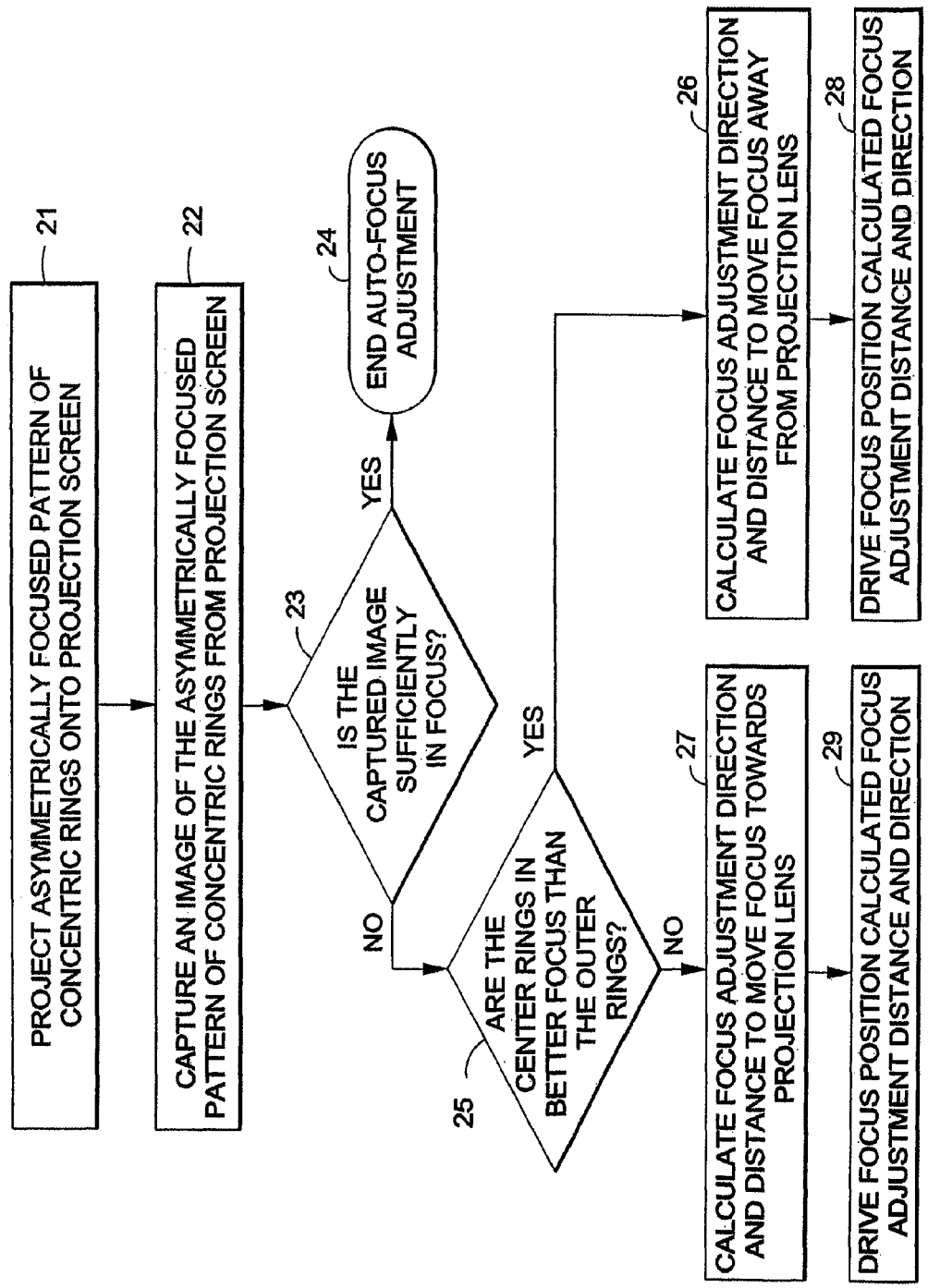
FIG. 5 is a flowchart illustrating an exemplary auto-focus process for a projection lens having a spherical aberration in the first embodiment.

FIG. 5 is an exemplary auto-focus process in projector 100 for a situation when projection lens system 106 has a spherical aberration. Briefly, according to the process steps shown in FIG. 5, projector 100 projects an asymmetrically focused pattern through projection lens system 106 onto projection screen 300. The asymmetrically focused pattern comprises concentric rings which are asymmetrically focused such that rings at a more central location of the pattern are focused by projection lens system 106 differently from rings at a more peripheral location of the pattern. Image capture unit 110 then captures an image of the asymmetrically focused pattern from projection screen 300. Control unit 103 calculates a focus adjustment direction such that a situation where focus is too close to projection lens system 106 is indicated in a case where rings more central to the pattern have better focus than rings at the periphery, and a situation where focus is too far from projection lens system 106 is indicated in a case where rings at a more central location of the pattern have poorer focus than rings at the periphery. Focus position control unit 107 then drives the focus position of projection lens system 106 in the calculated focus adjustment direction so as to move from an out-of-focus state of projection lens system 106 toward an in-focus state.

In more detail, in step 21, control unit 103 causes projector 100 to project an image of an asymmetrically focused pattern of concentric rings onto projection screen 300 using light projector unit 105 and projection lens system 106.

In step 22, image capture unit 110 captures an image of the asymmetrically focused pattern on projection screen 300. The captured image is then stored in memory 102.

In step 23, control unit 103 determines whether the captured image is sufficiently in focus by comparing the contrast of rings at a more central location of the captured image to the contrast of rings at the periphery. Comparing the contrast of the rings may be accomplished by comparing the contrast at positions at the boundaries of the rings, as discussed above in reference to FIGS. 3B and 4B.

Control unit 103 may compare two rings or more than two rings in order to determine whether the captured image is sufficiently in focus. If the contrast of the rings in the captured image does not deviate by more than a threshold value, control unit 103 determines that the captured image is sufficiently in focus and ends the auto-focus adjustment in step 24.

If the contrast of the rings in the captured image deviates by more than a threshold value, then control unit 103 proceeds to step 25 to determine whether the center rings of the captured image have better focus than the outer rings. In this example, control unit 103 determines whether the center rings have a higher level of contrast than the outer rings, indicating better focus of the center rings.

If the center rings are in better focus than the outer rings, control unit 103 proceeds to step 26 to calculate a focus adjustment direction and distance to move focus away from projection lens system 106 by increasing the focused image distance. If the center rings are not in better focus than the outer rings, control unit 103 proceeds instead to step 27 to calculate a focus adjustment direction and distance to move focus toward projection lens system 106 by decreasing the focused image distance.

In this example embodiment, the focus adjustment distance calculated in steps 26 and 27 is based on the magnitude of the difference in contrast of the center and outer rings. The larger the difference in contrast, the greater the focus adjustment distance.

Although the calculations in steps 26 and 27 may not determine an ideal distance to adjust the focus position after capturing one image of the asymmetrically focused pattern, control unit 103 is able to determine the proper focus adjustment direction after capturing one image. The determination of the proper focus adjustment direction generally allows for quicker auto-focus than methods that determine the proper direction by trial and error.

In steps 28 and 29, control unit 103 commands focus position control unit 107 to reposition a focus lens or lenses the calculated focus adjustment direction and distance so as to move toward a better focus. Focus position control unit 107 then drives the focus lens or lenses the calculated distance in the calculated direction to adjust the focus position of projection lens system 106 so as to move from an out-of-focus state of projection lens system 106 toward an in-focus state.

In other embodiments, focus is re-checked by repeating the above-described process. For example, if there is a large deviation in contrast determined in step 23, then it may be desirable to re-check focus. More precisely, after completing steps 28 or 29, focus is re-checked by returning to step 22 to capture another image of the asymmetrically focused pattern on projection screen 300. The second captured image is then used by control unit 103 in step 23, as described above, to check if the captured image of the asymmetrically focused pattern is sufficiently in focus after adjusting the focus position of projection lens system 106. If the captured image is not sufficiently in focus, the example process described above would then be repeated until control unit 103 determines that the captured image is sufficiently in focus.

Figure 6B:
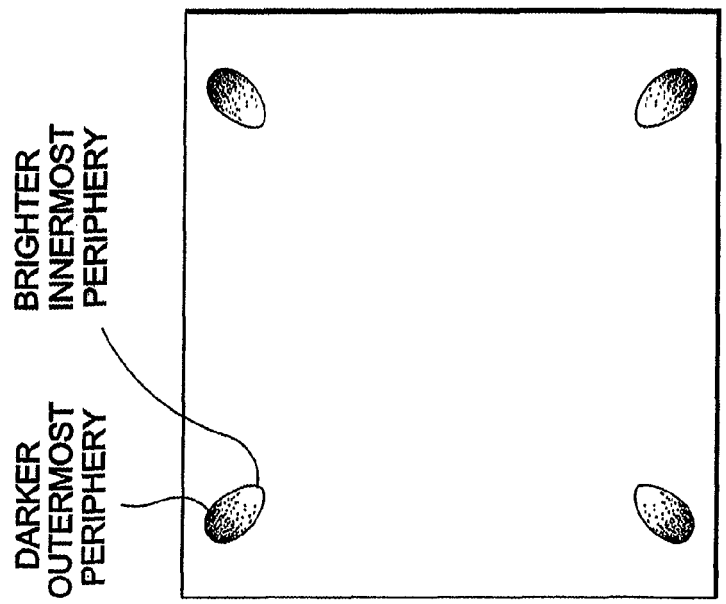
FIG. 6B illustrates an example of an asymmetrically focused pattern corresponding to FIG. 6A.
Figure 6A:
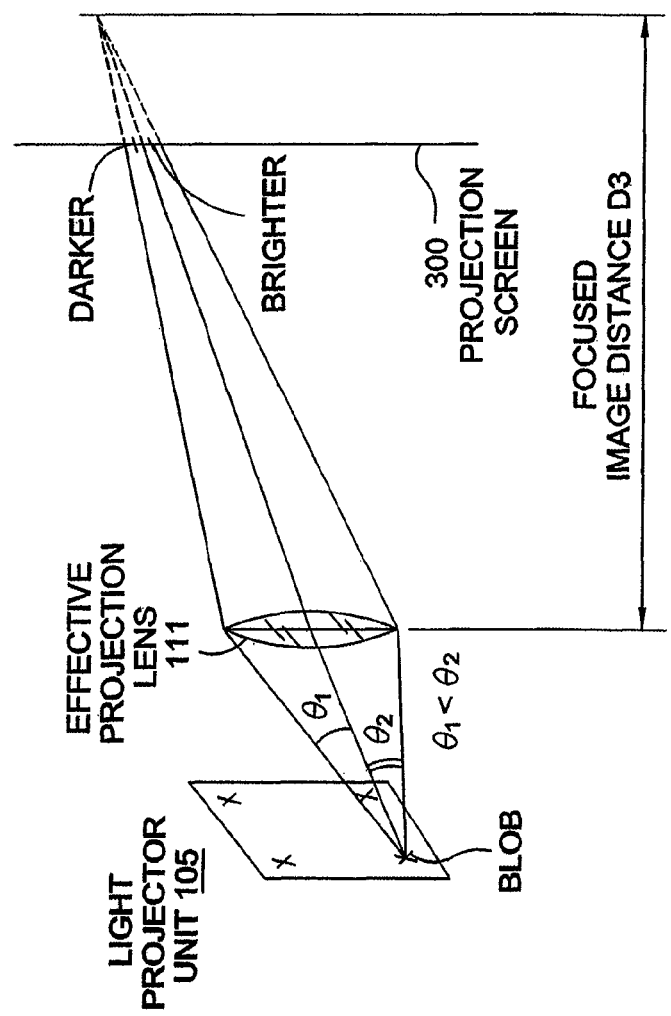
FIG. 6A illustrates an example of focus too far from a projection lens having a coma aberration.

FIG. 6A is a diagram showing the variation in focus for an exemplary asymmetrically focused pattern projected onto projection screen 300 from projector 100 when projection lens system 106 has a coma aberration. Effective projection lens 111 represents an effective lens based on the positions of the multiple lenses within projection lens system 106.

As shown in FIG. 6A, light projector unit 105 emits light so as to display four blobs for projection to projection screen 300. The four blobs comprise an example of an asymmetrically focused pattern where each of the four blobs in the asymmetrically focused pattern should have a nearly uniform brightness when projected onto projection screen 300 with effective projection lens 111 sufficiently in focus.

The asymmetrically focused pattern projected in FIG. 6A has blobs located at the corners of the pattern. When there is a coma aberration in projection lens system 106, blobs in the corners of the pattern demonstrate more variation in brightness than blobs closer to the center of the pattern. By increasing the variation in brightness in the blobs, the variation in focus can be more accurately measured as described below in reference to FIG. 8.

To better demonstrate the effects of a coma aberration, the projection of only one blob from light projector unit 105 is shown in FIG. 6A, however, all four blobs are projected onto projection screen 300 in practice. The projection of the blob is indicated by projection lines extending to the edges of effective projection lens 111, and from the edges of effective projection lens 111 to projection screen 300.

The focused image distance of effective projection lens 111 is indicated by focused image distance D3, which is the distance between the center of effective projection lens 111 and the focused image plane for effective projection lens 111. The focused image plane is where light emitted for the projected blob would be in focus for a given focus position.

As shown in FIG. 6A, when the focused image distance is farther from effective projection lens 111 than projection screen 300, the brightness of the projected asymmetrically focused pattern will vary due to a coma aberration in projection lens system 106.

In regards to the blob projected in FIG. 6A, the top half of effective projection lens 111 receives less light than the bottom half because $\theta_1 < \theta_2$. Consequently, the outer periphery of the projected blob, represented by the top distance between the projection lines on projection screen 300 will be darker than the innermost periphery of the projected blob, represented by the bottom distance between the projection lines on projection screen 300.

In accordance with the example process described in FIG. 2 above, control unit 103 would calculate a focus adjustment direction so as to move focus toward effective projection lens 111. When focused image distance D3 is decreased so as to more closely match the distance between effective projection lens 111 and projection screen 300, the brightness of the blobs becomes more uniform, indicating a more in-focus state of effective projection lens 111.

FIG. 6B shows an image of an asymmetrically focused pattern of four blobs as projected onto projection screen 300 in FIG. 6A. FIG. 6B also represents an initial image of an asymmetrically focused pattern captured by image capture unit 110 and stored in memory 102 as part of the exemplary process outlined in reference to FIG. 2.

In this example, the outermost peripheries of the projected blobs are darker than the innermost peripheries of the projected blobs. Control unit 103 can then calculate a focus adjustment direction by using the asymmetrical aspect of the brightness of a projected blob in the captured image. As shown in FIG. 6A, a blob that is darker in the outermost periphery indicates that focus should be adjusted toward effective projection lens 111.

Figure 7B:
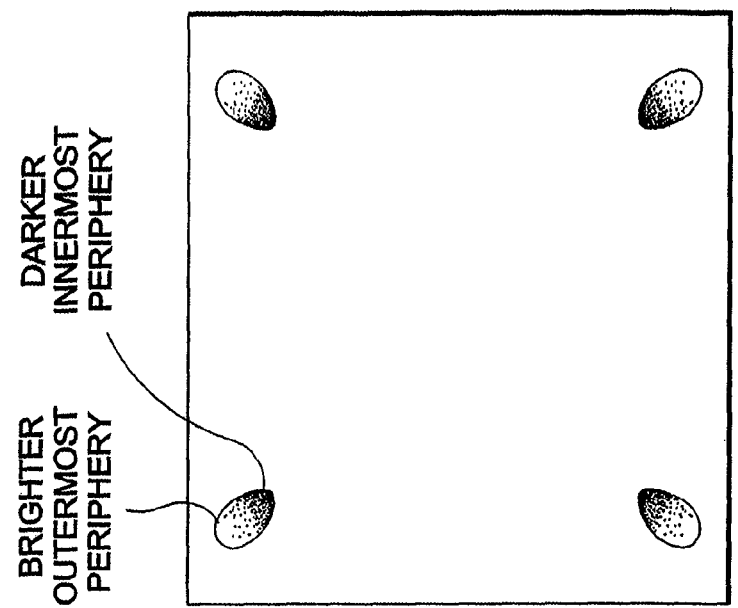
FIG. 7B illustrates an example of an asymmetrically focused pattern corresponding to FIG. 7A.
Figure 7A:
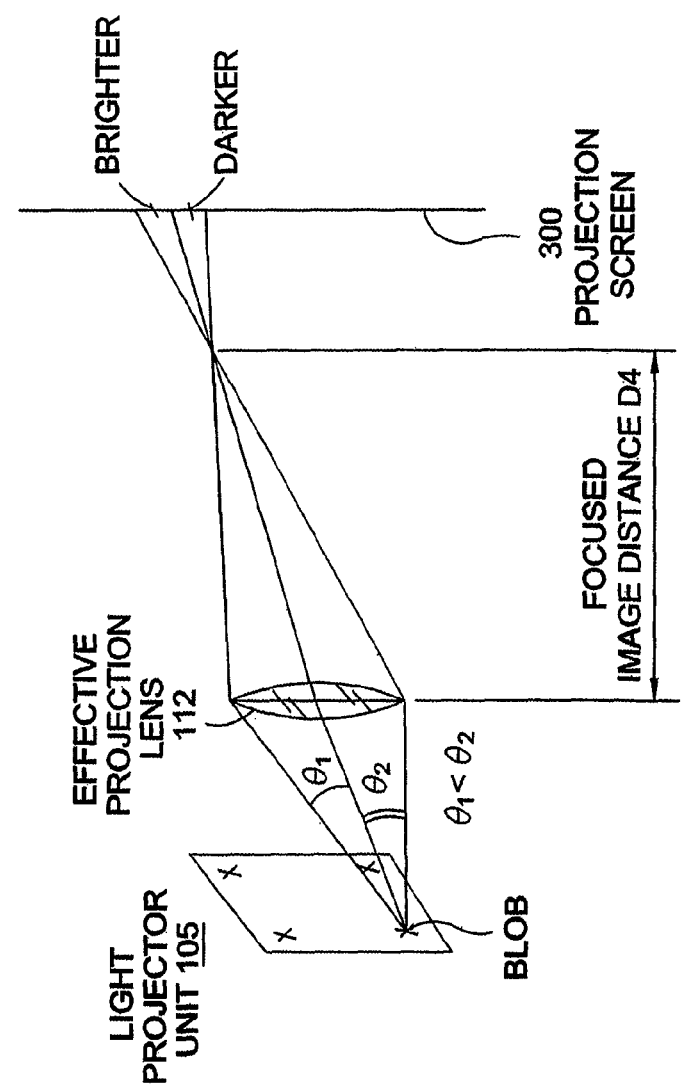
FIG. 7A illustrates an example of focus too close to a projection lens having a coma aberration.

FIG. 7A is a diagram showing the variation in focus when projection lens system 106 has a coma aberration and a focus that is closer to effective projection lens 112 than projection screen 300.

As shown in FIG. 7A, light projector unit 105 emits light so as to display four blobs for projection to projection screen 300. As in the example of FIG. 6A, each of the four blobs in the asymmetrically focused pattern should have a nearly uniform brightness when projected onto projection screen 300 with effective projection lens 112 sufficiently in focus.

The focused image distance of effective projection lens 112 is indicated by focused image distance D4, which is the distance between the center of effective projection lens 112 and the focused image plane for effective projection lens 112. The focused image plane is where light emitted for the projected blob would be in focus for the given focus position of projection lens system 106, as shown by the intersection of the projection lines in FIG. 7A before reaching projection screen 300.

As illustrated in FIG. 7A, when focus is closer to effective projection lens 112 than projection screen 300, the brightness of the projected asymmetrically focused pattern will vary due to a coma aberration in projection lens system 106.

In regards to the blob projected in FIG. 7A, the top half of effective projection lens 112 receives less light than the bottom half because $\theta_1 < \theta_2$, as was the case for the blob projected in FIG. 6A. However, unlike FIG. 6A, the top half of effective projection lens 112 focuses light onto the bottom half of the projected blob and the bottom half of effective projection lens 112 focuses light onto the top half of the projected blob in FIG. 7A. This difference between effective projection lens 111 and effective projection lens 112 is due to focus being too close to effective projection lens 112. Consequently, the outer periphery of the projected blob, represented by the top distance between the projection lines on projection screen 300 will be brighter than the innermost periphery of the projected blob, represented by the bottom distance between the projection lines on projection screen 300.

In accordance with the example process described in FIG. 2 above, control unit 103 would calculate a focus adjustment direction so as to move focus away from effective projection lens 112. When focused image distance D4 is increased so as to more closely match the distance between effective projection lens 112 and projection screen 300, the brightness of the blobs becomes more uniform, indicating a more in-focus state of effective projection lens 112.

FIG. 7B shows an image of an asymmetrically focused pattern of four blobs as projected onto projection screen 300 in FIG. 7A. FIG. 7B also represents an initial image of an asymmetrically focused pattern captured by image capture unit 110 and stored in memory 102 as part of the exemplary process outlined in reference to FIG. 2.

In this example, the outermost peripheries of the projected blobs are brighter than the innermost peripheries of the projected blobs. Control unit 103 can then calculate a focus adjustment direction by using the asymmetrical aspect of the brightness of a projected blob in the captured image. As shown in FIG. 7A, a blob that is brighter in the outermost periphery indicates that focus should be adjusted away from effective projection lens 112.

FIG. 8 is an exemplary auto-focus process in projector 100 corresponding to a situation when projection lens system 106 has a coma aberration, as in FIGS. 6A and 7A. Briefly, according to the process steps shown in FIG. 8, projector 100 projects an asymmetrically focused pattern through projection lens system 106 onto projection screen 300. The asymmetrically focused pattern comprises uniform blobs projected to the corners of projection screen 300. Image capture unit 110 then captures an image of the asymmetrically focused pattern from projection screen 300. Control unit 103 calculates a focus adjustment direction such that a situation where focus is too close to projection lens system 106 is indicated by a blob that is brighter at an outermost periphery as compared to the innermost periphery, and a situation where focus is too far from projection lens system 106 is indicated in a case where the blob is brighter at the innermost periphery than at an outermost periphery. Focus position control unit 107 then drives the focus position of projection lens system 106 in the calculated focus adjustment direction so as to move from an out-of-focus state of projection lens system 106 toward an in-focus state.

In more detail, in step 31, control unit 103 causes projector 100 to project an image of an asymmetrically focused pattern of uniform blobs onto projection screen 300 using light projector unit 105 and projection lens system 106.

In step 32, image capture unit 110 captures an image of the asymmetrically focused pattern on projection screen 300. The captured image is stored in memory 102 via system bus 104.

In step 33, control unit 103 determines whether the captured image is sufficiently in focus by comparing the brightness between the outermost periphery and the innermost periphery of a blob in the captured image. Control unit 103 may compare the peripheries of several blobs or even a single blob, as in the example process of FIG. 8, in order to determine whether the captured image is sufficiently in focus. If the difference in brightness of the innermost and outermost peripheries of the blob do not deviate by more than a threshold value, control unit 103 determines that the captured image is sufficiently in focus and ends the auto-focus adjustment in step 34.

If the difference in brightness of the innermost and outermost peripheries of the blob deviates by more than a threshold value, control unit 103 proceeds to step 35 to determine whether the outermost periphery is darker than the innermost peripheries.

In step 35, if the outermost periphery is darker than the innermost periphery, focus of projection lens system 106 is too far from projection lens system 106 and control unit 103 proceeds to step 36 to calculate a focus adjustment direction and distance to move focus toward projection lens system 106. If the outermost periphery is not darker than the innermost peripheries, control unit 103 proceeds instead to step 37 to calculate a focus adjustment direction and distance to move focus away from projection lens system 106.

The focus adjustment distance calculated in steps 36 and 37 is based on the magnitude of the difference in brightness measured in the different peripheries. The larger the difference in brightness in the innermost periphery and the outermost periphery, the greater the focus adjustment distance.

In steps 38 and 39, control unit 103 commands focus position control unit 107 to drive a focus lens or lenses in the calculated focus adjustment direction for the calculated distance so as to move toward a more in-focus state. Focus position control unit 107 then drives the focus lens or lenses the calculated distance in the calculated direction to adjust the focus position of projection lens system 106 so as to move from an out-of-focus state of projection lens system 106 toward an in-focus state.

In other embodiments, focus is re-checked by repeating the above-described process. For example, if there is a large deviation in brightness determined in step 33, then it may be desirable to re-check focus. More precisely, after completing steps 38 or 39, focus is re-checked by returning to step 32 to capture another image of the asymmetrically focused pattern on projection screen 300. The second captured image is then used by control unit 103 in step 33, as described above, to check if the captured image of the asymmetrically focused pattern is sufficiently in focus after adjusting the focus position of projection lens system 106. If the captured image is not sufficiently in focus, the example process described above would then be repeated until control unit 103 determines that the captured image is sufficiently in focus.

Second Embodiment

Figure 9:
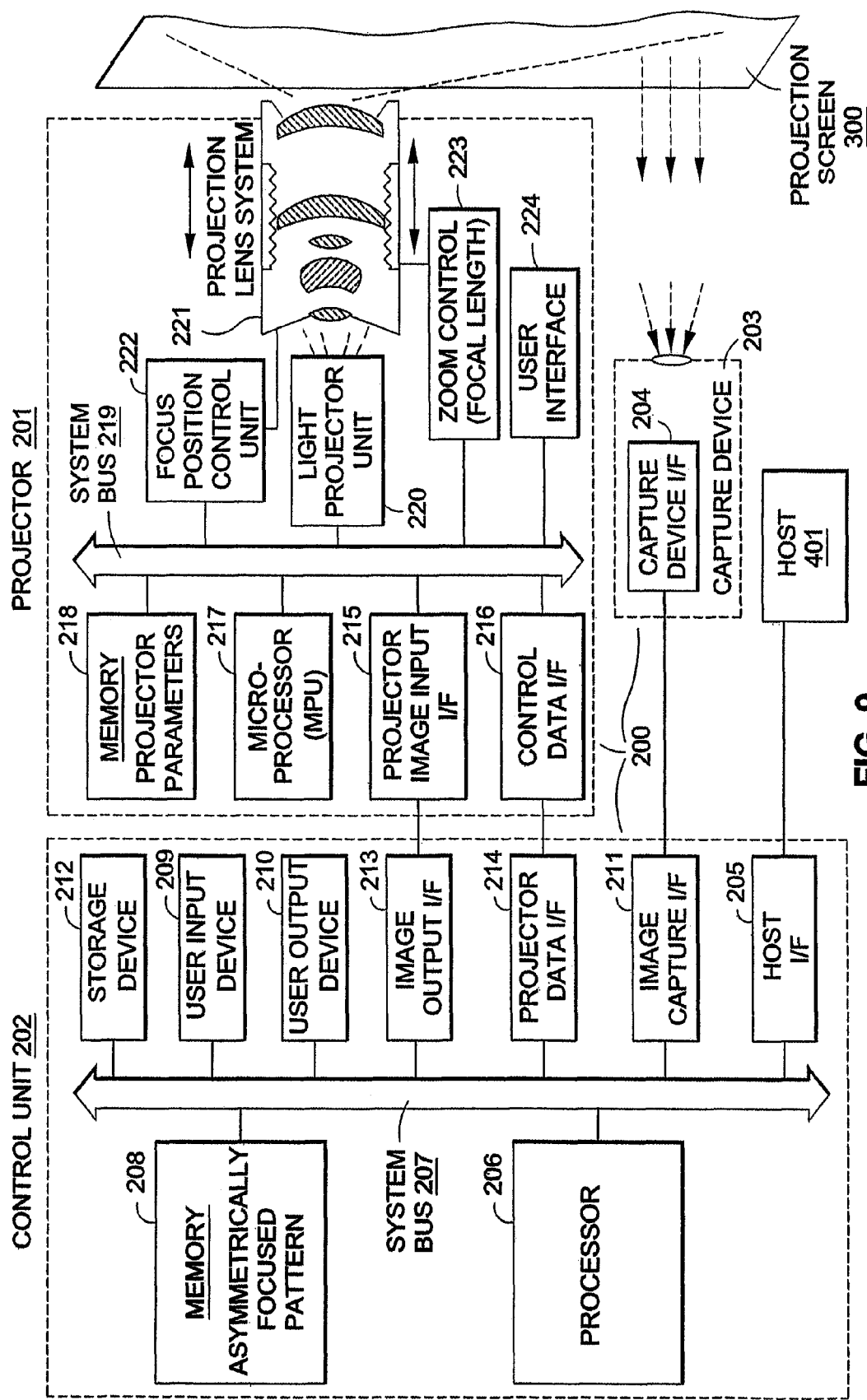
FIG. 9 illustrates a second example embodiment of an image projection system for projecting an image onto a projection screen.

FIG. 9 illustrates a second embodiment, and shows an image projection system 200 that includes projector 201, control unit 202 and capture device 203. As with projector 100 of FIG. 1, projector 201 may include an LCD projector, DLP projector, LCOS projector, or LED projector. However, one difference between the first and second embodiments is that, unlike projector 100 of the first embodiment, projector 201 does not have a capture unit or control unit. Instead, control unit 202 and capture device 203 are components separate from projector 201.

Control unit 202 is constructed to receive image data from host 401 and to control projector 201 to project an image onto projection screen 300 in accordance with the image data received from host 401. Control unit 202 is also constructed to control capture device 203 to capture an image projected onto projection screen 300. Control unit 202 may include, for example, a desktop PC or a laptop PC.

Control unit 202 includes host interface 205 for communicating with host 401. Host 401 may include a device capable of transmitting image data to control unit 202, such as, a DVD player, camcorder, or digital camera. In an alternative embodiment, host 401 may also include an application executed at control unit 202.

As shown in FIG. 9, host interface 205 is coupled to processor 206 via system bus 207. Processor 206 is also coupled to memory 208 which is constructed for storing data, such as an asymmetrically focused pattern in accordance with this disclosure.

Processor 206 is further coupled to user input device 209 and user output device 210 via system bus 207. User input device 209 can include hardware such as, for example, a keyboard or a mouse, which allow a user of control unit 202 to input commands. User output device 210 can include hardware such as a display monitor or a screen, which may display information pertaining to the operation of image projection system 200.

A storage device 212 having computer-readable media is also coupled to processor 206 via system bus 207. Storage device 212 may include, for example, a CD-ROM drive or a hard disk drive. In one exemplary implementation, storage device 212 is used by processor 206 to read data and program instructions to be loaded into memory 208 in order to execute a process for controlling image projection system 200. Storage device 212 may also be used to load asymmetrically focused patterns into memory 208.

As shown in FIG. 9, control unit 202 includes image capture interface 211 for communicating with capture device 203. Image capture interface 211 is coupled to processor 206 via system bus 207.

Control unit 202 includes two interfaces for communicating with projector 201. Both interfaces are coupled to processor 206 via system bus 207. The first interface, image output interface 213, is constructed for communicating projection commands to projector 201. The second interface, projector data interface 214, is used for all other communications between control unit 202 and projector 201, such as focus control commands in accordance with this disclosure.

Image output interface 213 and projector data interface 214 communicate respectively with projector image input interface 215 and control data interface 216 of projector 201. Image input interface 215 is constructed to receive projection commands from control unit 202 and is coupled to microprocessor 217 via system bus 219. Similarly, control data interface 216 is constructed to communicate data, such as projector parameters, with control unit 202 and is also coupled to microprocessor 217 via system bus 219.

Microprocessor 217 is also coupled to memory 218 which is constructed for storing data, such as projector parameters in accordance with this embodiment.

Projector 201 also includes light projector unit 220 for emitting light in accordance with projection commands received from control unit 202 or from microprocessor 217. Light projector unit 220 is coupled to microprocessor 217, which controls light projector unit 220 via system bus 219.

As shown in FIG. 9, projection lens system 221 is constructed with multiple lenses to focus light emitted by light projector unit 220. The lenses of projection lens system 221 have inherent optical properties that affect the focus of a projected image on projection screen 300. Such optical properties may include aberrations in the lenses, such as spherical aberrations and coma aberrations.

Projection lens system 221 is arranged mechanically to allow for adjustable focus position and for adjustable zoom (focal length). The lenses in projection lens system 221 may include a combination of fixed lenses and adjustable lenses that reposition axially. In operation, the magnification of a projected image can be changed by repositioning a zoom lens in projection lens system 221. As the zoom lens moves, the focal length of the projection lens system changes, and a focus lens may be repositioned to keep the projected image sufficiently in focus. Additionally, a projected image can be focused by adjusting the focus position of a focus lens or multiple focus lenses.

Projection lens system 221 is connected to both focus position control unit 222 for adjusting the focus position of projection lens system 221, and zoom control unit 223 for adjusting the focal length of projection lens system 221. Focus position control unit 222 and zoom control unit 223 may include servo motors or a system of gears and cams to drive various lenses within projection lens system 221 to new positions. Focus position control unit 222 and zoom control unit 223 are coupled to microprocessor 217 via system bus 219, and are constructed to receive commands from microprocessor 217 to reposition lenses in projection lens system 221.

Microprocessor 217 is also coupled to user interface 224 via system bus 219. User interface 224 is constructed for receiving user input, such as zoom and focus commands. User interface 224 may also include a display for displaying menus and information pertaining to the operation of projector 201.

As shown in FIG. 9, capture device 203 includes a capture device interface 204 for communicating with control unit 202 via image capture interface 211. Capture device 203 is constructed for capturing images from projection screen 300 and is controlled by control unit 202. Capture device 203 may include a camera with auto-focus set on the sharp boundaries of projection screen 300 or a pinhole camera that is generally in-focus for most distances from capture device 203. Capture device 300 may also include, for example, a web camera or a video camera.

In accordance with an example embodiment of the present disclosure, control unit 202 requests projector parameters from projector 201 via projector data interface 214. The projector parameters include focus settings that pertain to projection lens system 221 of projector 201. The focus settings may include, for example, a conversion ratio between a millimeter movement of a focus lens of projection lens system 221 to a meter change in a focused image distance projected by projection lens system 221. This focus setting may also be represented as a percentage. In an alternative embodiment, the focus setting may include an incremental distance for moving a focus lens of projection lens system 221.

Projector 201 receives the request for projector parameters at data control interface 216, and microprocessor 217 retrieves projector parameters from memory 218. Processor 217 then controls control data interface 216 to send the projector parameters to control unit 202.

After receiving the projector parameters at projector data interface 214, processor 206 retrieves data for an asymmetrically focused pattern from memory 208 via system bus 207. Memory 208 may store data for multiple asymmetrically focused patterns that may correspond to specific characteristics of projector 201 provided in the projector parameters. Memory 208 may also receive image data for asymmetrically focused patterns from host 401 via host interface 205 or from storage device 212.

After retrieving the image data for an asymmetrically focused pattern, processor 206 processes the image data and transmits a projection command to projector 201. The projection command corresponds to the image data for the asymmetrically focused pattern and is transmitted from image output interface 213 to projector image input interface 215.

Microprocessor 217 then processes the image data corresponding to the asymmetrically focused pattern and controls light projector unit 220 to emit light in accordance with the image data. The light emitted from light projector unit 220 forms an image of the asymmetrically focused pattern on projection screen 300 after passing through projection lens system 221.

After transmitting the image data to projector 201, control unit 202 then transmits an image capture command to capture device 203 via image capture interface 211. The capture command controls image capture device 203 to capture an image of the asymmetrically focused pattern on projection screen 300. The image capture command may also specify a focus setting, such as the smallest aperture size of image capture device 203.

After capturing the image of the asymmetrically focused pattern, image capture device 203 transmits the captured image to control unit 202 via capture device interface 204.

Control unit 202 receives the captured image at image capture interface 211 and stores the captured image in memory 208. Processor 206 then retrieves the image of the asymmetrically focused pattern and the captured image from memory 208, and analyzes the captured image to determine whether one portion of the captured asymmetrically focused pattern has a different focus than another portion of the captured asymmetrically focused pattern. If there is more than a threshold difference in focus, processor 206 calculates a focus adjustment direction by using asymmetrical aspects of the captured asymmetrically focused pattern.

Processor 206 then calculates a focus adjustment distance based on the focus settings included in the projector parameters and generates a corresponding focus control command. The focus control command may include a distance and direction to move a focus lens in projection lens system 221, such as −5.0 mm. In an alternative embodiment, the focus control command may only specify a direction in which to move a focus lens of projection lens system 221.

After generating the focus control command, it is sent to projector 201 via projector data interface 214 and is received at projector 201 by control data interface 216. The focus control command is processed by microprocessor 217, which controls focus position control unit 222 to drive a focus lens of projection lens system 221 in accordance with the focus control command.

Figure 10:
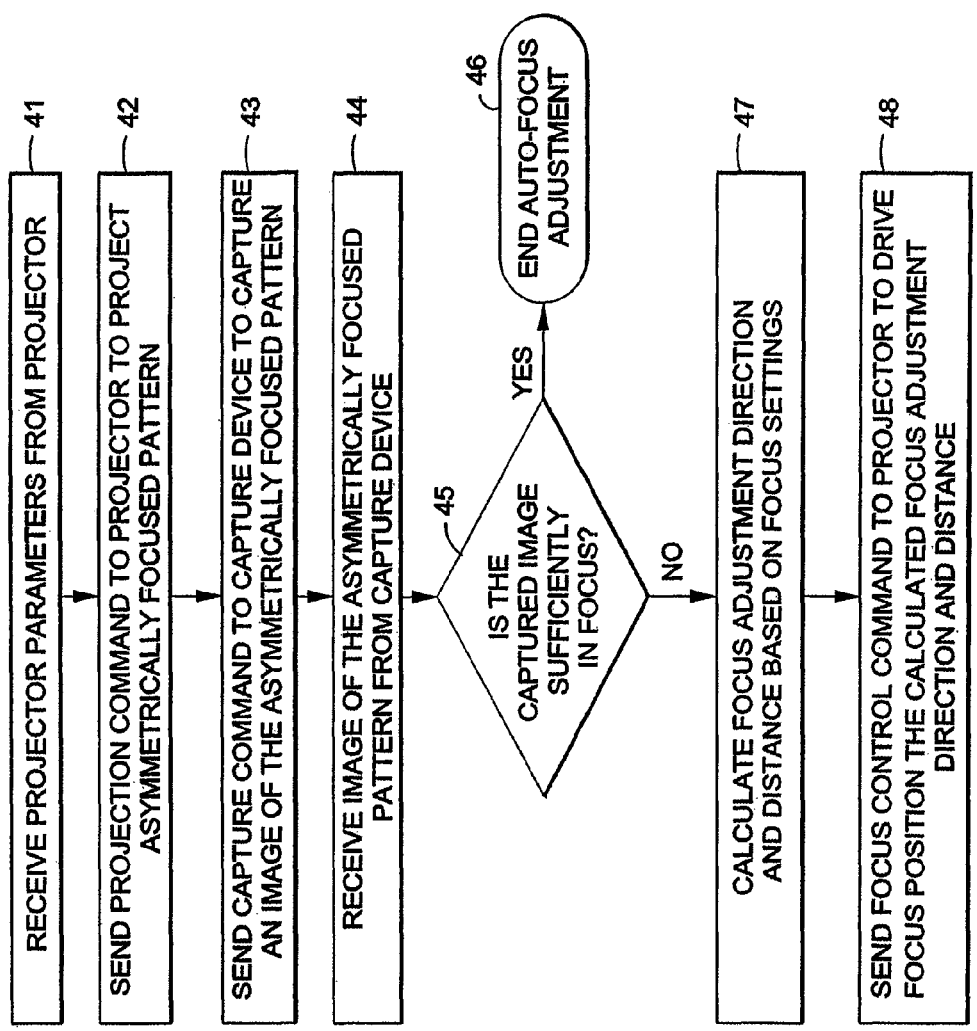
FIG. 10 is a flowchart illustrating an exemplary auto-focus process in the second embodiment.

FIG. 10 is a flowchart illustrating an example auto-focus process for image projection system 200. Briefly, according to the process steps shown in FIG. 10, control unit 202 receives projector parameters from projector 201. Control unit 202 then controls projector 201 to project an asymmetrically focused pattern through projection lens system 221 onto projection screen 300. The asymmetrically focused pattern is imaged by projection lens system 221 onto projection screen 300 with a focus at one portion on the screen that differs from focus at another portion. Control unit 202 then controls capture device 203 to capture an image of the asymmetrically focused pattern from projection screen 300. After receiving the captured image from capture device 203, control unit 202 calculates a focus adjustment direction and distance by using asymmetrical aspects of the captured image and focus settings provided by the projector parameters. Control unit 202 then controls projector 201 so that focus position control unit 222 drives the focus position of projection lens system 221 in the calculated focus adjustment direction so as to move from an out-of-focus state of projection lens system 221 toward an in-focus state.

In more detail, in step 41, control unit 202 requests projector parameters from projector 201 via projector data interface 214. The request is received by projector 201 at control data interface 216. Microprocessor 217 processes the request by retrieving the projector parameters from memory 218. The projector parameters include focus settings that pertain to projection lens system 221 of projector 201. The focus settings may include a conversion ratio between a millimeter movement of a focus lens of projection lens system 221 to a meter change in a focused image distance projected by projection lens system 221. This focus setting may also be represented as a percentage.

The projector parameters are sent to control unit 202 by control data interface 216. Control unit 202 receives the projector parameters at projector data interface 216 and stores the projector parameters in memory 208.

In step 42, processor 206 retrieves an asymmetrically focused pattern from memory 208 to generate a projection command for projector 201. Processor 206 may select a specific asymmetrically focused pattern from a plurality of asymmetrically focused patterns based on the projector parameters received in step 41. Processor 206 generates the projection command and controls image output interface 213 to transmit the projection command to projector 201.

The projection command is received by projector image input interface 215 and is then processed by microprocessor 217, which subsequently causes projector 201 to project an asymmetrically focused pattern to projection screen 300 using light projector unit 220 and projection lens system 221 as discussed above.

In step 43, control unit 202 transmits a capture image command to capture device 203 via image capture interface 211. Capture device 203 receives the capture image command at capture device interface 204 and captures an image of the asymmetrically focused pattern from projection screen 300 in accordance with the capture image command. As noted above, the capture image command may specify a focus setting of capture device 203 in addition to an instruction to capture an image of the asymmetrically focused pattern. The captured image is then transmitted to control unit 202 via capture device interface 204.

In step 44, the captured image is received by control unit 202 at image capture interface 211. The captured image is then stored in memory 208.

In step 45, the captured image of the asymmetrically focused pattern is retrieved from memory 208 by processor 206. Processor 206 determines whether the captured image is sufficiently in focus by comparing asymmetrical aspects of the captured image at different positions. As discussed above for the stand-alone embodiment, an asymmetrical aspect of the captured image may include differences in contrast or brightness at different positions in the captured image.

Processor 206 may compare two positions or more than two positions to determine whether the captured image is sufficiently in focus. Processor 206 may select positions to compare in the captured image by using data for the asymmetrically focused pattern in memory 208. Alternatively, processor 206 can be programmed to analyze specific positions in the captured image without accessing data for the asymmetrically focused pattern from memory 208.

If asymmetrical aspects of the captured image do not deviate by more than a threshold value, processor 206 determines that the captured image is sufficiently in focus and ends the auto-focus adjustment in step 46.

If asymmetrical aspects of the captured image deviate by more than a threshold value, then processor 206 determines that the asymmetrically focused pattern is not sufficiently in focus and calculates a focus adjustment direction and distance in step 47.

In step 47, processor 206 calculates a focus adjustment direction based on the locations of the positions in the captured image with higher levels of a measured asymmetrical aspect. As described in more detail below with reference to FIG. 11 and FIG. 12, a higher level of contrast or brightness at positions closer to the center of the captured image indicate a focus adjustment in one direction, whereas, a higher level of contrast or brightness at positions farther from the center of the captured image indicate a focus adjustment in the opposite direction.

In step 47, processor 206 also calculates a focus adjustment distance based on the focus settings stored in memory 208 and the degree of variation in the measured asymmetrical aspect at different positions of the captured image. Generally, a larger variation in an asymmetrical aspect provides for a greater focus adjustment distance. In an alternative embodiment, the focus adjustment distance is a set incremental distance based on the focus settings stored in memory 208, without considering the degree of variation in the measured asymmetrical aspect.

In step 48, processor 206 generates a focus control command to drive a focus lens or lenses of projector 201 the calculated focus adjustment direction and distance. The focus control command is sent from projector data interface 214 to projector 201. Projector 201 receives the focus control command via control data interface 216. Microprocessor 217 processes the focus control command and controls focus position control unit 222 to drive the focus lens or lenses to adjust the focus position of projection lens system 221 in accordance with the focus control command so as to move from an out-of-focus state of projection lens system 221 toward an in-focus state.

In other embodiments, focus is re-checked by repeating the above-described process. For example, if there is a large deviation in asymmetrical aspects determined in step 45, then it may be desirable to re-check focus. More precisely, after completing step 48, focus is re-checked by returning to step 43 to capture another image of the asymmetrically focused pattern on projection screen 300. The second captured image is then used by processor 206 in step 45, as described above, to check if the captured image of the asymmetrically focused pattern is sufficiently in focus after adjusting the focus position of projection lens system 221. If the captured image is not sufficiently in focus, the example process described above would then be repeated until processor 206 determines that the captured image is sufficiently in focus. The example process of FIG. 10 can also be repeated with a different asymmetrically focused pattern stored in memory 208.

Figure 11:
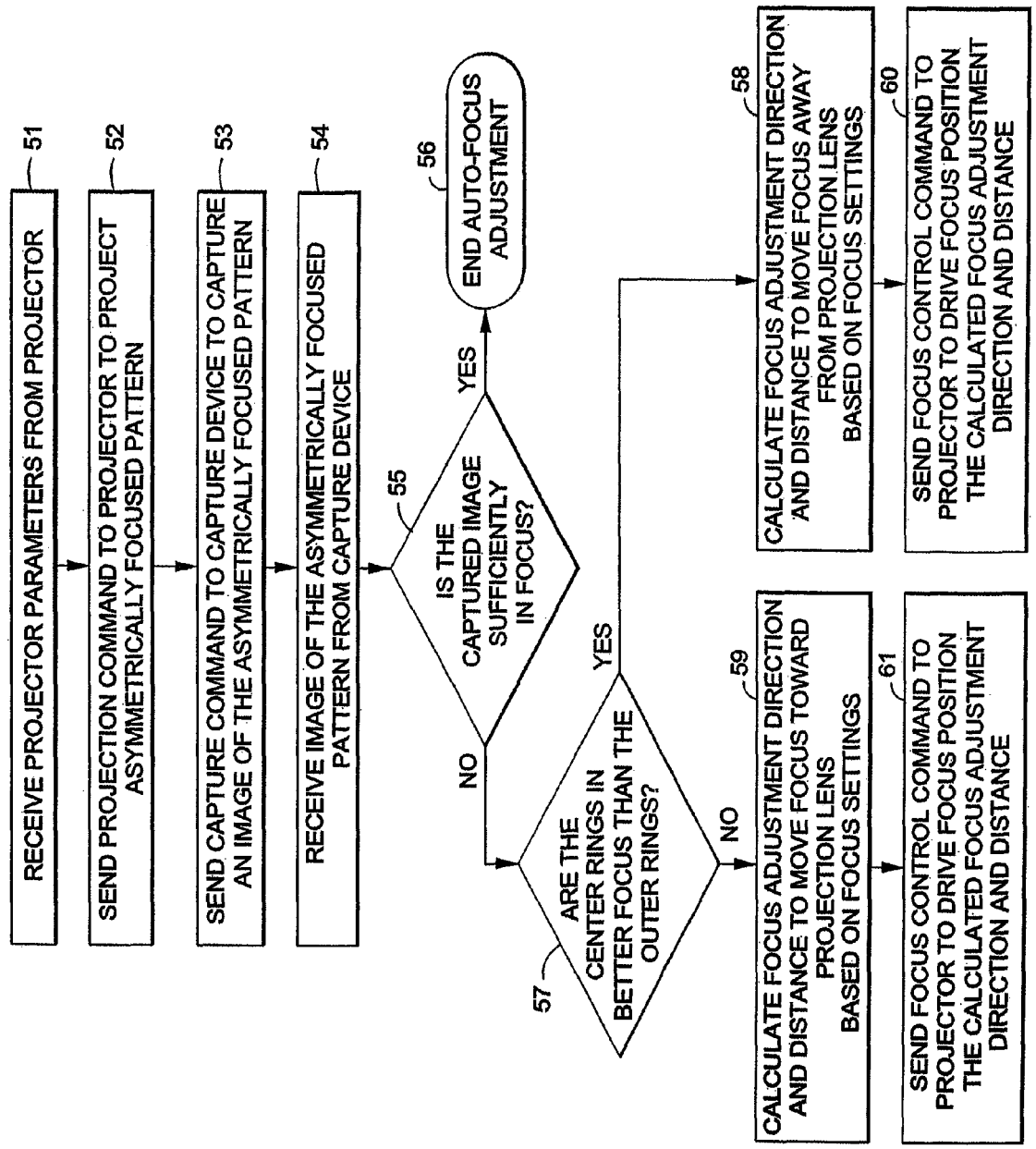
FIG. 11 is a flowchart illustrating an exemplary auto-focus process for a projection lens having a spherical aberration in the second embodiment.

FIG. 11 is an exemplary auto-focus process for image projection system 200 when projection lens system 221 has a spherical aberration, as in FIGS. 6A and 7A. Briefly, according to the process steps shown in FIG. 11, control unit 202 receives projector parameters from projector 201. Control unit 202 then controls projector 201 to project an asymmetrically focused pattern through projection lens system 221 onto projection screen 300. The asymmetrically focused pattern comprises concentric rings which are asymmetrically focused such that rings at a more central location of the pattern are focused by projection lens system 221 differently from rings at a more peripheral location of the pattern. Control unit 202 then controls capture device 203 to capture an image of the asymmetrically focused pattern from projection screen 300. After receiving the captured image from capture device 203, control unit 202 calculates a focus adjustment direction such that a situation where focus is too close to projection lens system 221 is indicated in a case where rings more central to the pattern have better focus than rings at the periphery, and a situation where focus is too far from projection lens system 221 is indicated in a case where rings at a more central location of the pattern have poorer focus than rings at the periphery. Control unit 202 then controls projector 201 so that focus position control unit 222 drives the focus position of projection lens system 221 in the calculated focus adjustment direction so as to move from an out-of-focus state of projection lens system 221 toward an in-focus state.

In more detail, in step 51, control unit 202 requests projector parameters from projector 201 via projector data interface 214. Microprocessor 217 processes the request by retrieving the projector parameters from memory 218 and controlling control data interface 216 to transmit the projector parameters to control unit 202. The projector parameters are then received by projector data interface 214 and stored in memory 208. As described above, the projector parameters include focus settings that pertain to projection lens system 221 of projector 201.

In step 52, processor 206 retrieves an asymmetrically focused pattern of concentric rings from memory 208. Processor 206 generates a projection command corresponding to the asymmetrically focused pattern and controls image output interface 213 to transmit the projection command to projector 201. Projector 201 receives the projection command via projector image input interface 215 and microprocessor 217 controls light projector unit 220 to emit light in accordance with the projection command.

In step 53, control unit 202 transmits a capture image command to capture device 203 via image capture interface 211. Capture device 203 receives the capture image command via capture device interface 204 and captures an image of the asymmetrically focused pattern from projection screen 300 in accordance with the capture image command. The captured image is then transmitted to control unit 202 via capture device interface 204.

In step 54, the captured image is received by control unit 202 at image capture interface 211. The captured image is then stored in memory 208.

In step 55, processor 206 determines whether the captured image is sufficiently in focus by comparing the contrast of rings at a more central location of the captured image to the contrast of rings at the periphery. Comparing the contrast of the rings may be accomplished by comparing the contrast at positions at the boundaries of the rings, as discussed above in reference to FIGS. 3B and 4B.

Processor 206 may compare two rings or more than two rings in order to determine whether the captured image is sufficiently in focus. If the contrast of the rings in the captured image does not deviate by more than a threshold value, processor 206 determines that the captured image is sufficiently in focus and ends the auto-focus adjustment in step 56.

If the contrast of the rings in the captured image deviates by more than a threshold value, then processor 206 proceeds to step 57 to determine whether the center rings of the captured image have better focus than the outer rings. In this example, processor 206 determines whether the center rings have a higher level of contrast than the outer rings, indicating better focus of the center rings.

If the center rings are in better focus than the outer rings, processor 206 proceeds to step 58 to calculate a focus adjustment direction and distance to move focus away from projection lens system 221 by increasing the focused image distance. If the center rings are not in better focus than the outer rings, processor 206 proceeds instead to step 59 to calculate a focus adjustment direction and distance to move focus toward projection lens system 221 by decreasing the focused image distance.

In this example embodiment, the focus adjustment distance calculated in steps 58 and 59 is based on the focus settings stored in memory 208 and the magnitude of the difference in contrast of the center and outer rings and the focus settings stored in memory 208. The larger the difference in contrast, the greater the focus adjustment distance.

Although the calculations in steps 58 and 59 may not determine an ideal distance to adjust the focus position after capturing one image of the asymmetrically focused pattern, processor 206 is able to determine the proper focus adjustment direction after capturing one image. The determination of the proper focus adjustment direction generally allows for quicker auto-focus than methods that determine the proper direction by trial and error.

In steps 60 and 61, processor 206 generates a focus control command to drive a focus lens or lenses of projector 201 the calculated focus adjustment direction and distance. The focus control command is sent from projector data interface 214 to projector 201. Projector 201 receives the focus control command via control data interface 216. Microprocessor 217 processes the focus control command and controls focus position control unit 222 to drive the focus lens or lenses to adjust the focus position of projection lens system 221 in accordance with the focus control command so as to move from an out-of-focus state of projection lens system 221 toward an in-focus state.

In other embodiments, focus is re-checked by repeating the above-described process. For example, if there is a large deviation in contrast determined in step 55, then it may be desirable to re-check focus. More precisely, after completing steps 60 or 61, focus is re-checked by returning to step 53 to capture another image of the asymmetrically focused pattern on projection screen 300. The second captured image is then used by processor 206 in step 55, as described above, to check if the captured image of the asymmetrically focused pattern is sufficiently in focus after adjusting the focus position of projection lens system 221. If the captured image is not sufficiently in focus, the example process described above would then be repeated until processor 206 determines that the captured image is sufficiently in focus.

Figure 12:
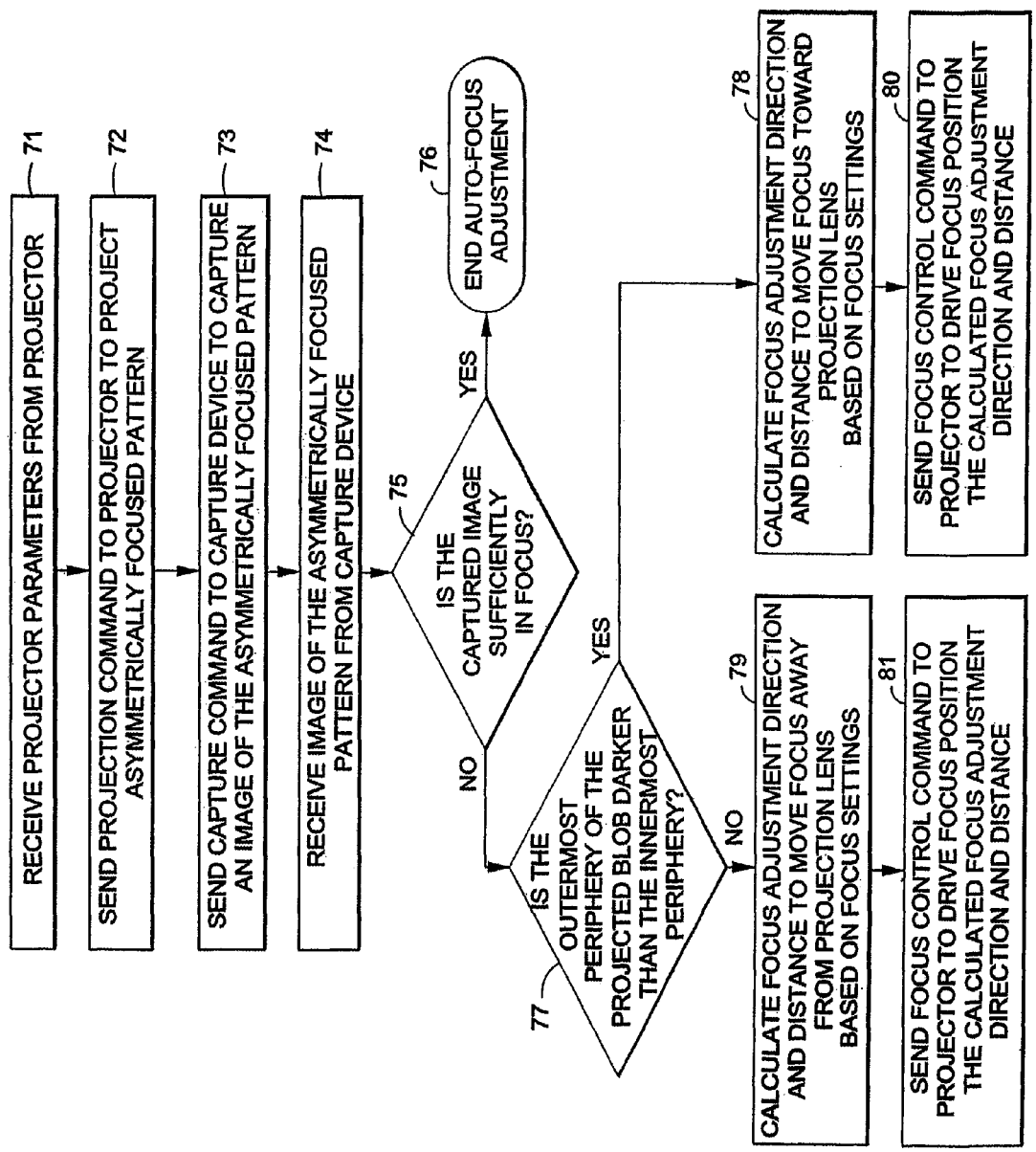
FIG. 12 is a flowchart illustrating an exemplary auto-focus process for a projection lens having a coma aberration in the second embodiment.

FIG. 12 is an exemplary auto-focus process for image projection system 200 corresponding to a situation when projection lens system 221 has a coma aberration, as in FIGS. 6A and 7A. Briefly, according to the process steps shown in FIG. 12, control unit 202 receives projector parameters from projector 201. Control unit 202 then controls projector 201 to project an asymmetrically focused pattern through projection lens system 221 onto projection screen 300. The asymmetrically focused pattern comprises uniform blobs projected to the corners of projection screen 300. Control unit 202 then controls capture device 203 to capture an image of the asymmetrically focused pattern from projection screen 300. After receiving the captured image from capture device 203, control unit 202 calculates a focus adjustment direction such that a situation where focus is too close to projection lens system 221 is indicated by a blob that is brighter at an outermost periphery as compared to the innermost periphery, and a situation where focus is too far from projection lens system 221 is indicated in a case where the blob is brighter at the innermost periphery than at an outermost periphery. Control unit 202 then controls projector 201 so that focus position control unit 222 drives the focus position of projection lens system 221 in the calculated focus adjustment direction so as to move from an out-of-focus state of projection lens system 221 toward an in-focus state.

In more detail, in step 71, control unit 202 requests projector parameters from projector 201 via projector data interface 214. After receiving the request at control data interface 216, microprocessor 217 processes the request by retrieving the projector parameters from memory 218 and controlling control data interface 216 to transmit the projector parameters. The projector parameters are then received by projector data interface 214 and stored in memory 208.

In step 72, processor 206 retrieves an asymmetrically focused pattern of uniform blobs from memory 208. Processor 206 generates a corresponding projection command and controls image output interface 213 to transmit the projection command to projector 201. After receiving the projection command at projector image input interface 215, microprocessor 217 controls projector 201 to project an image of an asymmetrically focused pattern of uniform blobs onto projection screen 300 using light projector unit 220 and projection lens system 221.

In step 73, control unit 202 transmits a capture image command to capture device 203 via image capture interface 211. Capture device 203 receives the capture image command via capture device interface 204 and captures an image of the asymmetrically focused pattern from projection screen 300 in accordance with the capture image command. The captured image is then transmitted to control unit 202 via capture device interface 204.

In step 74, the captured image is received by control unit 202 at capture image interface 211, and stored in memory 208.

In step 75, processor 206 determines whether the captured image is sufficiently in focus by comparing the brightness between the outermost periphery and the innermost periphery of a blob in the captured image. Processor 206 may compare the peripheries of several blobs or even a single blob, as in the example process of FIG. 12, in order to determine whether the captured image is sufficiently in focus. If the difference in brightness of the innermost and outermost peripheries of the blob do not deviate by more than a threshold value, processor 206 determines that the captured image is sufficiently in focus and ends the auto-focus adjustment in step 76.

If the difference in brightness of the innermost and outermost peripheries of the blob deviates by more than a threshold value, processor 206 proceeds to step 77 to determine whether the outermost periphery is darker than the innermost peripheries.

In step 77, if the outermost periphery is darker than the innermost periphery, focus of projection lens system 221 is too far from projection lens system 221 and processor 206 proceeds to step 78 to calculate a focus adjustment direction and distance to move focus toward projection lens system 221. If the outermost periphery is not darker than the innermost peripheries, central processing unit proceeds instead to step 79 to calculate a focus adjustment direction and distance to move focus away from projection lens system 221.

In steps 81 and 82, processor 206 generates a focus control command to drive a focus lens or lenses of projector 201 the calculated focus adjustment direction and distance. The focus control command is sent from projector data interface 216 to projector 201. Projector 201 receives the focus control command via control data interface 216. Microprocessor 217 processes the focus control command and controls focus position control unit 222 to drive the focus lens or lenses to adjust the focus position of projection lens system 221 in accordance with the focus control command so as to move from an out-of-focus state of projection lens system 221 toward an in-focus state.

In other embodiments, focus is re-checked by repeating the above-described process. For example, if there is a large deviation in brightness determined in step 75, then it may be desirable to re-check focus. More precisely, after completing steps 80 or 81, focus is re-checked by returning to step 73 to capture another image of the asymmetrically focused pattern on projection screen 300. The second captured image is then used by processor 206 in step 75, as described above, to check if the captured image of the asymmetrically focused pattern is sufficiently in focus after adjusting the focus position of projection lens system 221. If the captured image is not sufficiently in focus, the example process described above would then be repeated until processor 206 determines that the captured image is sufficiently in focus.

By virtue of the above-described arrangements, the proper direction to adjust a focus position can be determined without using a trial and error approach, thereby consistently moving a projection lens toward an in-focus state and reducing time wasted on iterations that adjust the focus position in the wrong direction.

Although the invention has been described with particular illustrative embodiments, the invention is not limited to the above-described embodiments and various changes and modification may be made by those of ordinary skill in the art without departing from the spirit and scope of this disclosure.

What is claimed is:

1. An image projection system comprising:
    a projector comprising a light projecting unit constructed to emit light in accordance with image data, a projection lens constructed to image light emitted by the light projecting unit onto a projection screen, and a focus adjusting mechanism constructed for controllable adjustment of focus of the projection lens;
    a capture device constructed to capture an image of the image projected onto the projection screen by the projection lens; and
    a control unit constructed to control the projector to project an asymmetrically focused pattern, and to control the capture device to capture an image of the asymmetrically focused pattern,
    wherein the asymmetrically focused pattern is imaged by the projection lens onto the projection screen with a focus at one position on the projection screen that differs from focus at another position thereof,
    wherein the control unit is further constructed to calculate a focus adjustment direction by using asymmetrical aspects of the captured image of the asymmetrically focused pattern and to control the projector to drive the focus adjustment mechanism in the calculated focus adjustment direction so as to move from an out-of-focus state of the projection lens toward an in-focus state.

2. An image projection system according to claim 1, further comprising:
    a light projecting unit interface for communicating between the light projecting unit and the control unit;
    a focus adjusting mechanism interface for communicating between the focus adjustment mechanism and the control unit;
    a capture device interface for communicating between the capture device and the control unit, wherein the capture device interface communicates the captured image of the image projected onto the projection screen from the capture device to the control unit;
    a first control unit interface for communicating between the control unit and the light projecting unit, wherein the first control unit interface communicates a projection command to emit the asymmetrically focused pattern from the control unit to the light projecting unit;
    a second control unit interface for communicating between the control unit and the capture device, wherein the second control unit interface communicates an image capture command from the control unit to the capture device; and
    a third control unit interface for communicating between the control unit and the focus adjustment mechanism, wherein the third control unit interface communicates a focus control command from the control unit to the focus adjustment mechanism to drive the focus adjustment mechanism in the calculated focus adjustment direction.

3. An image projection system according to claim 2, wherein the projection lens has a spherical aberration, and wherein the asymmetrically focused pattern comprises concentric rings which are asymmetrically focused such that rings at a more central location of the pattern are focused by the projection lens differently from rings at a more peripheral location of the pattern.

4. An image projection system according to claim 3, wherein the control unit calculates the focus adjustment direction such that a situation where focus is too close to the projection lens is indicated in a case where rings more central to the pattern have better focus than rings at the periphery thereof, and a situation where focus is too far from the projection lens is indicated in a case where rings at a more central location of the pattern have poorer focus than rings at the periphery.

5. An image projection system according to claim 2, wherein the projection lens has a coma aberration, and wherein the asymmetrically focused pattern comprises uniform blobs projected to corners of the projection screen.

6. An image projection system according to claim 5, wherein the control unit calculates the focus adjustment direction such that a situation where focus is too close to the projection lens is indicated by a blob that is brighter at an outermost periphery as compared to the innermost periphery thereof, and a situation where focus is too far from the projection lens is indicated in a case where the blob is brighter at the innermost periphery than at an outermost periphery.

7. An image projection system according to claim 1, further comprising:
    a first projector interface for receiving projection commands from the control unit;
    a second projector interface for communicating between the projector and the control unit, wherein the second projector interface communicates projector parameters including focus settings from the projector to the control unit, and the control unit uses the focus settings obtained from the projector parameters in generating a focus control command;
    a capture device interface for communicating between the capture device and the control unit, wherein the capture device interface communicates the captured image of the image projected onto the projection screen from the capture device to the control unit;
    a first control unit interface for communicating between the control unit and the projector, wherein the first control unit interface communicates a projection command, via the first projector interface, to emit the asymmetrically focused pattern;
    a second control unit interface for communicating between the control unit and the capture device, wherein the second control unit interface communicates an image capture command from the control unit to the capture device; and
    a third control unit interface for communicating between the control unit and the projector, wherein the third control unit interface communicates the focus control command to the projector, via the second projector interface, to drive the focus adjustment mechanism in the calculated focus adjustment direction.

8. An image projection system according to claim 7, wherein the projection lens has a spherical aberration, and wherein the asymmetrically focused pattern comprises concentric rings which are asymmetrically focused such that rings at a more central location of the pattern are focused by the projection lens differently from rings at a more peripheral location of the pattern.

9. An image projection system according to claim 8, wherein the control unit calculates the focus adjustment direction such that a situation where focus is too close to the projection lens is indicated in a case where rings more central to the pattern have better focus than rings at the periphery thereof, and a situation where focus is too far from the projection lens is indicated in a case where rings at a more central location of the pattern have poorer focus than rings at the periphery.

10. An image projection system according to claim 7, wherein the projection lens has a coma aberration, and wherein the asymmetrically focused pattern comprises uniform blobs projected to corners of the projection screen.

11. An image projection system according to claim 10, wherein the control unit calculates the focus adjustment direction such that a situation where focus is too close to the projection lens is indicated by a blob that is brighter at an outermost periphery as compared to the innermost periphery thereof, and a situation where focus is too far from the projection lens is indicated in a case where the blob is brighter at the innermost periphery than at an outermost periphery.

12. An image projection system according to claim 1, further comprising a memory which stores image data corresponding to the asymmetrically focused pattern projected by the projector.

13. An image projection system according to claim 1, further comprising an interface to a host computer which supplies image data for projection by the light projecting unit when the projection lens is in the in-focus state.

14. A focus adjustment method for a projector which comprises a projection lens having an adjustable focus position, the method comprising:
    projecting an asymmetrically focused pattern through the projection lens onto a projection screen, wherein the asymmetrically focused pattern is imaged by the projection lens onto the projection screen with a focus at one portion on the screen that differs from focus at another portion thereof;
    capturing an image of the asymmetrically focused pattern from the projection screen;
    calculating a focus adjustment direction by using asymmetrical aspects of the captured image of the asymmetrically focused pattern;
    driving the focus position of the projection lens in the calculated focus adjustment direction so as to move from an out-of-focus state of the projection lens toward an in-focus state.

15. A focus adjustment method according to claim 14, wherein the projection lens has a spherical aberration, and wherein the asymmetrically focused pattern comprises concentric rings which are asymmetrically focused such that rings at a more central location of the pattern are focused by the projection lens differently from rings at a more peripheral location of the pattern.

16. A focus adjustment method according to claim 15, wherein the calculation step calculates the focus adjustment direction such that a situation where focus is too close to the projection lens is indicated in a case where rings more central to the pattern have better focus than rings at the periphery thereof, and a situation where focus is too far from the projection lens is indicated in a case where rings at a more central location of the pattern have poorer focus than rings at the periphery.

17. A focus adjustment method according to claim 14, wherein the projection lens has a coma aberration, and wherein the asymmetrically focused pattern comprises uniform blobs projected to corners of the projection screen.

18. A focus adjustment method according to claim 17, wherein the calculation step calculates the focus adjustment direction such that a situation where focus is too close to the projection lens is indicated by a blob that is brighter at an outermost periphery as compared to the innermost periphery thereof, and a situation where focus is too far from the projection lens is indicated in a case where the blob is brighter at the innermost periphery than at an outermost periphery.

19. A focus adjustment method according to claim 14, further comprising the step of retrieving image data corresponding to the asymmetrically focused pattern from a memory.

20. A focus adjustment method according to claim 14, further comprising the step of receiving image data over an interface to a host computer, and the step of projecting the received image data after driving the focus position to the in-focus state.

* * * * *